US007729660B2

(12) United States Patent
Kondo et al.

(10) Patent No.: US 7,729,660 B2
(45) Date of Patent: Jun. 1, 2010

(54) COMMUNICATION DEVICE, NON-CONTACT TYPE IC CARD MOUNTING SAME, AND INFORMATION APPARATUS

(75) Inventors: Satoru Kondo, Kanagawa (JP); Kenichi Kamiyama, Tokyo (JP); Yukio Tanaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 839 days.

(21) Appl. No.: 11/570,566

(22) PCT Filed: Apr. 14, 2006

(86) PCT No.: PCT/JP2006/307966

§ 371 (c)(1),
(2), (4) Date: Dec. 13, 2006

(87) PCT Pub. No.: WO2006/112410

PCT Pub. Date: Oct. 26, 2006

(65) Prior Publication Data

US 2009/0224893 A1    Sep. 10, 2009

(30) Foreign Application Priority Data

Apr. 15, 2005    (JP) .............................. 2005-118459

(51) Int. Cl.
*H04B 7/00*    (2006.01)
(52) U.S. Cl. .................. 455/41.2; 455/83; 455/193.2; 455/558; 455/291; 235/492; 235/451; 343/842; 343/764; 343/788
(58) Field of Classification Search ............... 455/41.2, 455/291, 83, 193.2, 558
See application file for complete search history.

(56) References Cited

U.S. PATENT DOCUMENTS 6,669,487 B1 * 12/2003 Nishizawa et al. ............ 439/60

(Continued)

FOREIGN PATENT DOCUMENTS

JP    2002-334310    11/2002

(Continued)

OTHER PUBLICATIONS

International Search Report dated Jul. 18, 2006.

*Primary Examiner*—Marceau Milord
(74) *Attorney, Agent, or Firm*—Sonnenschein Nath & Rosenthal LLP

(57) ABSTRACT

A communication device able to share one antenna and in addition able to sufficiently exhibit characteristics of a function as a reader, writer and a card function, a non-contact type IC card provided with that, and an information apparatus, wherein the device has a first transmission circuit 220 having first and second output terminals and outputting a carrier from the first and second output terminals in a first mode; an antenna circuit 210 including a node ND210, an inductor 211 having one end connected to the node, and having the other end connected to the second output terminal of the first transmission circuit, and a capacitor 212 connected between the node and the first output terminal of the first transmission circuit; a second transmission circuit 230 connected to the node of the antenna circuit and outputting the transmission data in a second mode; at least one reception circuit 240 connected to the node of the antenna circuit and performing reception processing with respect to data received at the antenna circuit; and a circuit switch unit 280 forming the antenna circuit as a serial resonance circuit including the inductor and the capacitor in the first mode and forming the antenna circuit as a parallel resonance circuit including the inductor and the capacitor in the second mode.

24 Claims, 20 Drawing Sheets

U.S. PATENT DOCUMENTS

| | | | |
|---|---|---|---|
| 6,896,523 B2 * | 5/2005 | Nishizawa et al. | 439/60 |
| 6,946,950 B1 * | 9/2005 | Ueno et al. | 340/10.1 |
| 7,031,662 B2 * | 4/2006 | Suzuki et al. | 455/63.1 |
| 7,046,573 B2 * | 5/2006 | Takazawa et al. | 365/229 |
| 7,089,388 B1 * | 8/2006 | Takaragi et al. | 711/164 |
| 7,505,794 B2 * | 3/2009 | Watanabe et al. | 455/572 |
| 7,516,479 B2 * | 4/2009 | Kurita | 726/2 |

FOREIGN PATENT DOCUMENTS

| | | |
|---|---|---|
| JP | 2004-342040 | 12/2004 |
| JP | 2004-355212 | 12/2004 |
| JP | 2006-025155 | 1/2006 |

* cited by examiner

IMPEDANCE CHANGE IN CARD MODE

IMPEDANCE CHANGE IN RW MODE

COMMUNICATION DEVICE, NON-CONTACT TYPE IC CARD MOUNTING SAME, AND INFORMATION APPARATUS

TECHNICAL FIELD

The present invention relates to a communication device which can be mounted on a non-contact type IC card, a non-contact type IC card mounting the same, and an information apparatus such as a mobile phone.

BACKGROUND ART

The development and growth of non-contact type IC cards have been remarkable. IC card functions etc. are now being built into mobile phones due to the card size. Non-contact type IC cards are disclosed in for example Patent Documents 1 and 2.

FIG. 1 is a diagram showing the configuration of a front end circuit 10 of a general non-contact type IC card use R/W (reader/writer) device.

The front end circuit 10 of this non-contact type IC card use R/W device is mainly configured by, as shown in FIG. 1, a reception side circuit 11, a transmission side circuit 12, a serial resonance use capacitor 13, an R/W antenna 14, etc. A resistor 15 is an internal resistor of an (antenna) coil 16.

Further, in FIG. 1, C1 indicates a capacitance of the capacitor 13, R1 indicates a resistance value of the resistor 15, and L1 indicates an inductance of the coil 16.

The operation of the front end circuit 10 of the R/W device of FIG. 1 will be explained.

At the time of the transmission of data, a modulation wave signal is output from the transmission side circuit 12, a current flows in the capacitor 13 connected in series to the antenna 14, and the coil 16 forming the antenna 14, and a magnetic field is emitted from the antenna 14.

On the other hand, at the time of reception, a constant carrier signal is output from the transmission side circuit 12, but it is possible to perform load modulation on the card side so that the carrier signal received at the reception side circuit 11 becomes a load modulated signal and the demodulation data can be extracted.

In the transmission and reception of data, the capacitor 13 and the coil 16 form a resonance circuit. At this time, an impedance seen from the transmission side circuit 12 becomes small (much current flows), and the transmission magnetic field from the antenna 14 becomes the largest.

Namely, the front end circuit 10 at the time of the transmission/reception is configured with the coil 16 and the capacitor 13 connected in series. Further, basically ideally a carrier frequency of the signal used is set so as to coincide with a resonance frequency of the coil 16 and the capacitor 13 and the impedance is the lowest at the resonance frequency.

The coil 16 configuring the loop antenna is expressed by the resistance 15 including the loss and forms a serial resonance circuit together with the capacitor 13.

The resonance frequency f0 thereof is expressed as in the following equation.

[Equation 1]

$$f0=1/(2\pi*\sqrt{(L1*C1)}) \quad (1)$$

An impedance Z of the antenna circuit at this time becomes as follows. When a resistance value R1 of the resistor 15 is small, the current can flow in the antenna with a high efficiency and the generated magnetic field becomes the maximum.

[Equation 2]

$$Z = R1 + j\omega L1 + 1/(j\omega C1) \quad (2)$$
$$= R1$$

Next, the front end circuit used in the non-contact type IC card will be explained.

FIG. 2 is a diagram showing the configuration of principal parts of the front end circuit used in a non-contact type IC card.

The front end circuit 20 used in the non-contact type IC card is principally configured by, as shown in FIG. 2, a transmission and reception side circuit 21, a capacitor 22, a card antenna 23, a resistor 24, etc.

Further, in FIG. 2, C2 indicates the capacitance of the capacitor 22, R2 indicates the resistance value of the resistor 24, and L2 indicates the inductance of the coil 25.

In the circuit of FIG. 2, the card function is set so that the resistor 24 and the coil 25 are connected in series, a capacitor 22 is connected parallel to the two ends of these, and resonance occurs at the used frequency.

Further, at the time of the resonance, basically ideally, the impedance of the combined circuit of the card antenna 22 and the parallel connected capacitors 22 becomes the highest.

The parallel resonance frequency f0 is expressed by the following equation.

[Equation 3]

$$f0=1/(2\pi*\sqrt{(L2*C2)}) \quad (3)$$

The impedance Z of the antenna circuit at this time is expressed by the following equation.

[Equation 4]

$$Z=1/(1/(R2+j\omega L2)+(j\omega C2)) \quad (4)$$

The impedance Z expressed by (Equation 4) where R2 is small becomes as follows, and the reception voltage becomes the maximum at the peak of the impedance.

$$Z \approx \infty \quad \text{[Equation 5]}$$

[Patent Document 1] Japanese Patent Publication (A) No. 2002-334310
[Patent Document 2] Japanese Patent Publication (A) No. 2004-355212

DISCLOSURE OF THE INVENTION

Problem to be Solved by the Invention

The circuit configuration optimum for the R/W (reader/writer) device and the circuit configuration optimum for the card are different as described above, therefore, it is difficult to satisfy both functions by a single front end circuit. It is therefore necessary to separately prepare an antenna and front end circuit optimum for each.

This means a larger number of front end parts and circuits and a plurality of antennas, therefore interference and the need for dealing with this. The difficulty of design was therefore high. Further, when using a single antenna, the apparatus ends up biased to either the characteristics of the R/W function or card function, and it was difficult to satisfy both characteristics.

In recent years, not only the card function, but also the R/W function has become demanded. It is, however, not easy to simultaneously satisfy both functions since it involve problems in characteristics, costs, etc.

The present invention provides a communication device able to share one antenna, and in addition able to sufficiently show characteristics of the function as the writer and the card function, a non-contact type IC card provided with that, and an information apparatus.

Means for Solving the Problems

A communication device of a first aspect of the present invention has a first transmission circuit having first and second output terminals and outputting carriers from the first and second output terminals in a first mode; an antenna circuit including a node, an inductor having one end connected to the node and having the other end connected to the second output terminal of the first transmission circuit, and at least one capacitor connected between the node and the first output terminal of the first transmission circuit; a second transmission circuit connected to the node of the antenna circuit and outputting the transmission data in a second mode; at least one reception circuit connected to the node of the antenna circuit and performing reception processing with respect to data received at the antenna circuit; and a circuit switch unit forming the antenna circuit as a serial resonance circuit including the inductor and the capacitor in the first mode and forming the antenna circuit as a parallel resonance circuit including the inductor and the capacitor in the second mode.

A non-contact type IC card of a second aspect of the present invention has a first transmission circuit having first and second output terminals and outputting carrier data from the first and second output terminals in a reader/writer mode, an antenna circuit including a node, an inductor having one end connected to the node and having the other end connected to the second output terminal of the first transmission circuit, and at least one capacitor connected between the node and the first output terminal of the first transmission circuit; a second transmission circuit connected to the node of the antenna circuit and modulating in load of the transmission data in the card mode; at least one reception circuit connected to the node of the antenna circuit and performing reception processing with respect to the data received at the antenna circuit; a circuit switch unit forming the antenna circuit as a serial resonance circuit including the inductor and the capacitor in the reader/writer mode in response to a mode control signal and forming the antenna circuit as a parallel resonance circuit including the inductor and the capacitor in the card mode; a memory; and a control unit for selectively supplying the transmission data to the first transmission circuit or second transmission circuit, performing predetermined processing with respect to the reception data of the reception circuit, and performing access control of the memory.

A third aspect of the present invention is an information apparatus having a communication function with a communication network, which information apparatus has a communication device having a reader/writer function and a card function, the communication device having a first transmission circuit having first and second output terminals and outputting carriers from the first and second output terminals in the first mode, an antenna circuit including a node, an inductor having one end connected to the node and having the other end connected to the second output terminal of the first transmission circuit, and at least one capacitor connected between the node and the first output terminal of the first transmission circuit, a second transmission circuit connected to the node of the antenna circuit and outputting the transmission data in the second mode, at least one reception circuit connected to the node of the antenna circuit and performing reception processing with respect to the data received at the antenna circuit, and a circuit switch unit forming the antenna circuit as a serial resonance circuit including the inductor and the capacitor in the first mode and forming the antenna circuit as a parallel resonance circuit including the inductor and the capacitor in the second mode.

EFFECT OF THE INVENTION

According to the present invention, it is not necessary to separate antennas for the reader/writer (R/W) and the card. One is sufficient. As a result, the problem due to the interference between the R/W use antenna and the card use antenna is eliminated. Since the antennas are decreased, the peripheral parts and circuits thereof are also decreased, the design becomes easy, and the cost can be reduced. Further, a front end circuit in which the costs of the parts and the design costs are inexpensive and which has a simple configuration and high performance is obtained.

DESCRIPTION OF NOTATIONS

100 . . . communication system, 110 . . . mobile phone, 115 . . . memory unit, 116 . . . communication device, 117 . . . control unit, 120 . . . non-contact type IC card, 130 . . . base station, 140 . . . communication network, 150 . . . server, 200,200A to 200F . . . communication device, 210, 210A to 210F . . . antenna circuit, 211 . . . antenna coil, 212, 212-1, 212-2, 213 . . . capacitor, 214 . . . switch, 215 . . . high resistance, ND210, ND211 . . . node, A, B . . . terminal, 220, 220A . . . transmission side circuit (first transmission circuit), 221, 221A . . . first output terminal, 222, 222A . . . second output terminal, 223 . . . first transmission buffer, 224 . . . second transmission buffer, 225 . . . switch, 226 . . . inverter, 227 . . . input terminal, 230 . . . response circuit (second transmission circuit), 240 . . . reception side circuit, 250 . . . switch, 260 . . . carrier generator, 270 . . . switch, 280, 280A, 280B . . . circuit switch unit, 300, 300A to 300F . . . non-contact type IC card, 310 . . . CPU (control unit), 320 . . . memory.

BEST MODE FOR WORKING THE INVENTION

Below, embodiments of the present invention will be explained with reference to the drawings.

Figure 3:
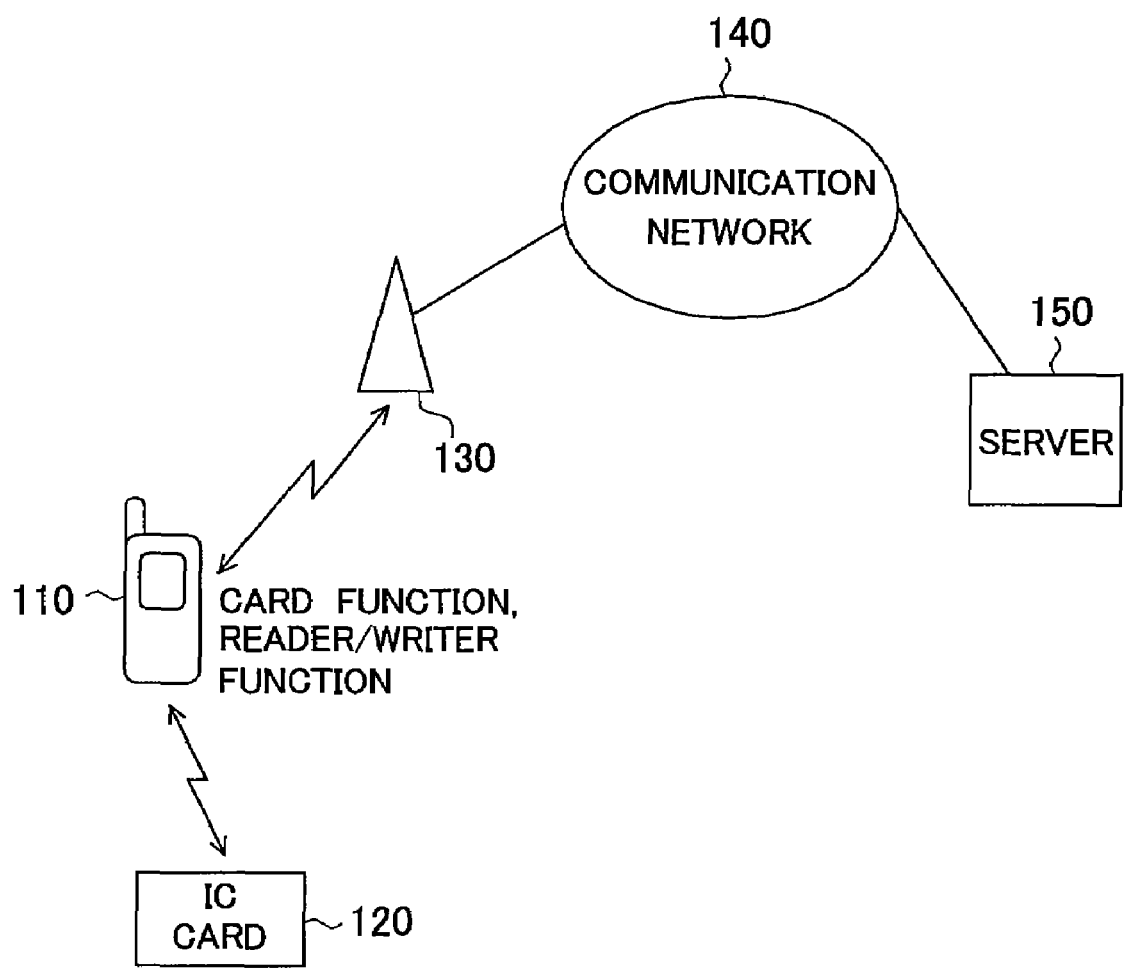
FIG. 3 is a diagram showing an example of the configuration of a communication system to which a mobile information apparatus according to an embodiment of the present invention constituted as a mobile phone is applied.

FIG. 3 is a diagram showing an example of the configuration of a communication device to which a mobile information apparatus according to an embodiment of the present invention constituted as a mobile phone is applied.

A communication system 100 shown in FIG. 3 is configured by a mobile phone 110, an external non-contact type IC card 120, a base station 130, a communication network 140, and a server 150.

The mobile phone 110 of the present embodiment has for example a built-in non-contact type IC card function and reader/writer function. The mounted reader/writer (R/W) function performs wireless communication with the non-contact type IC card 120 and establishes a connection when receiving a response (signal) from the external non-contact type IC card 120.

When the connection with the non-contact type IC card 120 is established, the mobile phone 110 is connected with the server 150 through the base station 130 and communication network 140 by the wireless communication according to a predetermined communication method and relays communication between the non-contact type IC card 120 and the server 150.

When mutual authentication of the two succeeds, the reader/writer function mounted in the mobile phone 110 performs processing for reading the information stored in the non-contact type IC card 120 and processing for writing new information into the non-contact type IC card 120 according to an instruction from the server 150.

Figure 4:
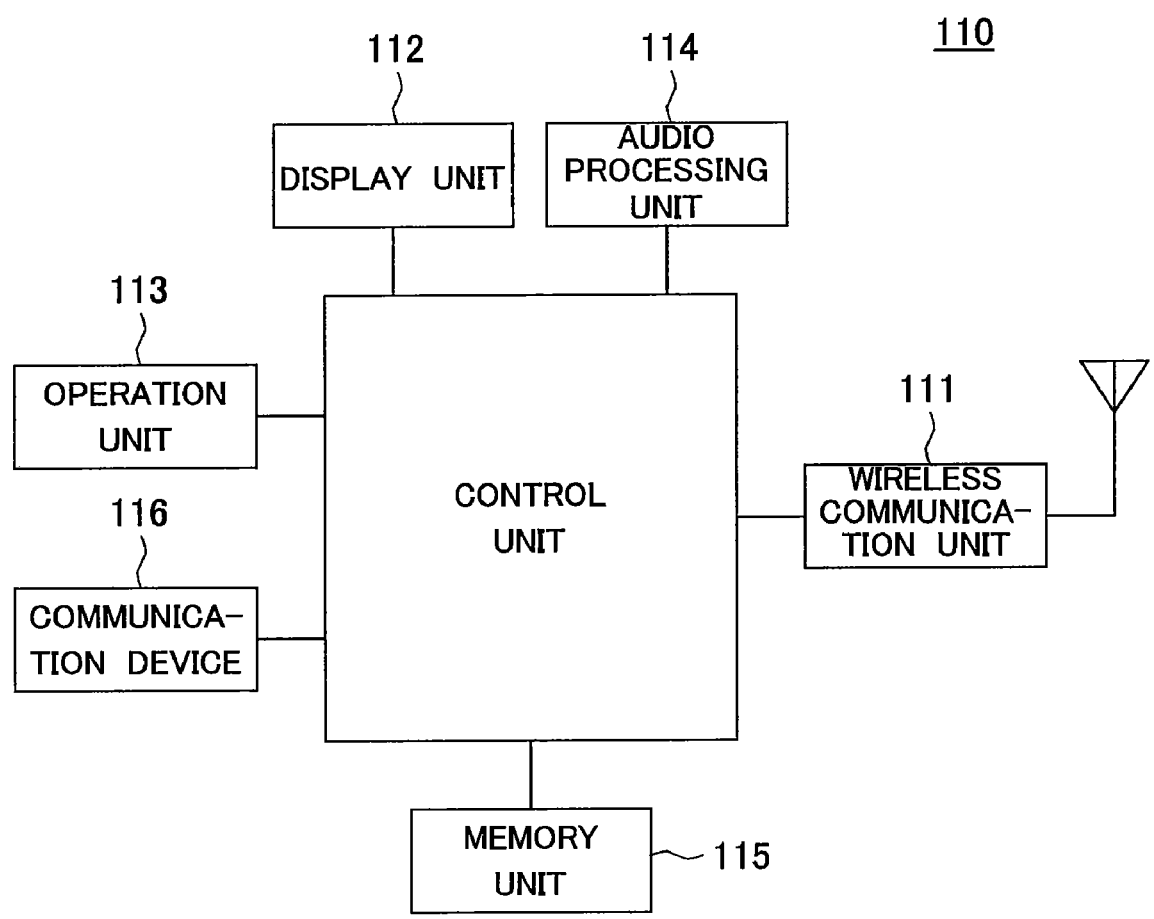
FIG. 4 is a block diagram showing an example of the basic configuration of a mobile phone according to the present embodiment.

FIG. 4 is a block diagram showing an example of a basic configuration of a mobile phone according to the present embodiment.

The mobile phone 110, as shown in FIG. 4, has a wireless communication unit 111 for wireless communication processing with the server 150 via the communication network 140, a display unit 112 configured by a liquid crystal display (LCD) etc., an operation unit 113 including operation keys such as ten keys, an audio processing unit 114 having a microphone and a speaker for audio input processing or audio output processing, a memory unit 115 storing a program, message data, address data, IC card use data etc., a communication device 116 forming a front end circuit unit for providing a non-contact type IC card function and reader/writer function, and a control unit (CPU) 117 for performing overall function control of the mobile phone 110, mode control for providing the non-contact type IC card function and reader/writer function, predetermined processing with respect to transmission data TD and reception data RD, and access to the memory unit 115 in accordance with that.

The wireless communication unit 111, display unit 112, operation unit 113, audio processing unit 114, memory unit 115, and control unit 117 form a usual mobile phone as constituted by a phone unit.

Further, the communication device 116, memory unit 115, and control unit 117 configure the card function unit for providing the non-contact type IC card function and reader/writer function.

Further, designation of the mode, switching, etc. are designed to be carried out under the control of the control unit 117 in accordance with the operation of the operation unit 114.

At this time, the control unit 117 outputs a mode control signal MD (Mode) and the transmission data TD to the communication device 116, receives the reception data RD, and performs processing for storage into the memory unit 115 etc. The memory unit 115 includes a nonvolatile memory such as a flash memory.

Note that, a configuration in which control units 117 are individually provided in the phone unit, card, and the card function unit is also possible.

Further, in the following explanation, the reader/writer mode corresponds to the first mode, and the card mode corresponds to the second mode.

Figure 5:
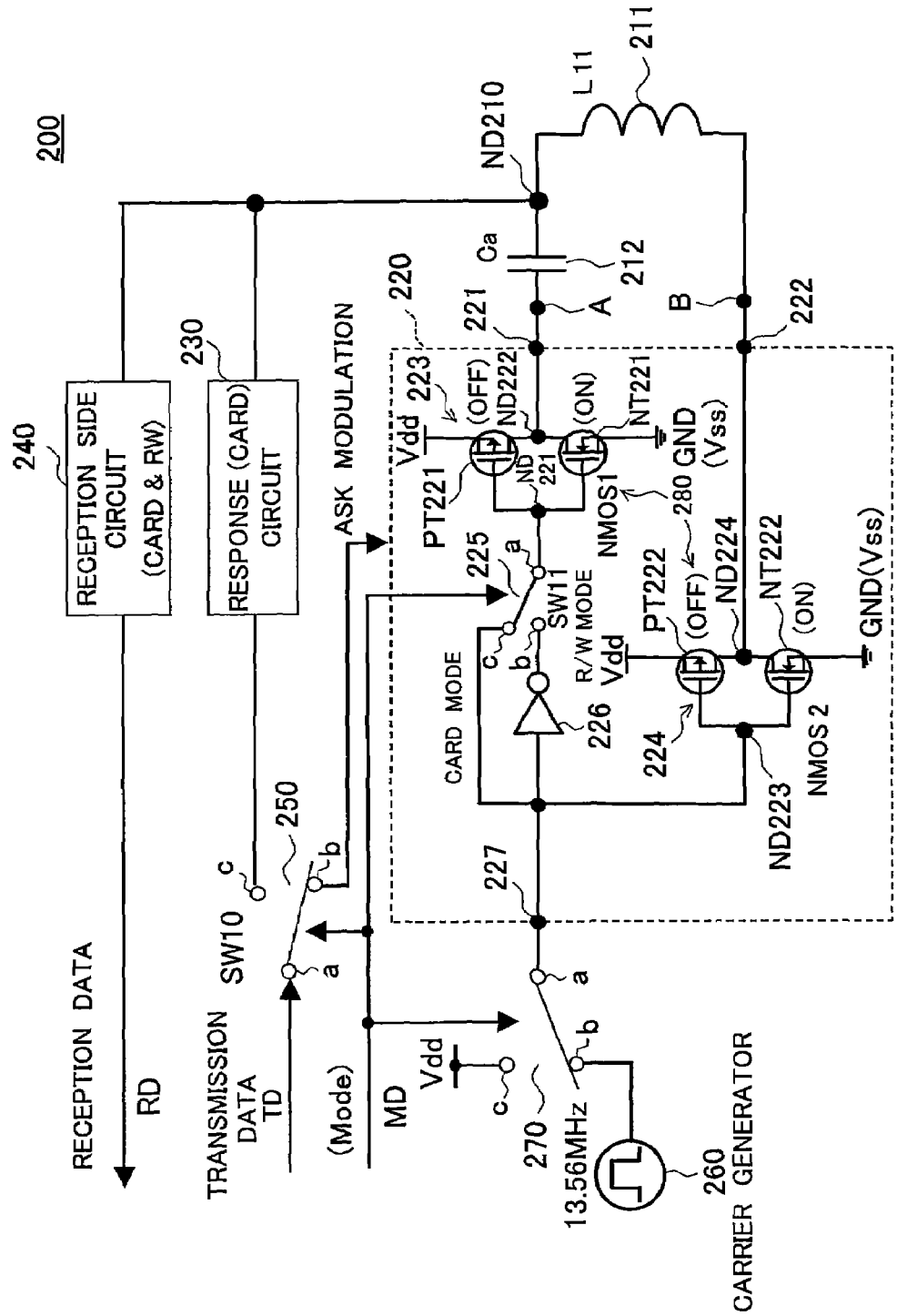
FIG. 5 is a diagram showing a first example of the configuration of a communication device having a built-in non-contact type IC card function and reader/writer function mounted in a mobile phone according to an embodiment of the present invention.

FIG. 5 is a diagram showing an example of the configuration of a communication device having a built-in non-contact type IC card function and reader/writer function mounted in a mobile phone according to an embodiment of the present invention.

Note that, in FIG. 5, a communication device 116 of FIG. 4 is expressed by using notation 200.

The communication device 200 of FIG. 5 has an antenna circuit 210, a transmission side circuit 220 as the first transmission circuit mainly used for the reader/writer function, a response (card) circuit 230 as the second transmission circuit for the card function, a reception side circuit 240, a switch (SW10) 250, a carrier generator 260 for generating a carrier having a frequency of 13.56 MHz, and a switch 270.

The antenna circuit 210 has a node ND210, an antenna coil (inductor) 211, and a capacitor 212. Further, in FIG. 5, Ca indicates the capacitance of the capacitor 212, and L11 indicates the inductance of the coil 211.

One end of the antenna coil 211 is connected to the node ND210, a first electrode (one end) of the capacitor 212 is connected to the node ND210, and a second electrode (other end) is connected to the first output terminal 221 of the transmission side circuit 220. Further, the other end of the antenna coil 211 is connected to the second output terminal 222 of the transmission side circuit 220.

The transmission side circuit 220 has a first output terminal 221, a second output terminal 222, a first transmission buffer 223, a second transmission buffer 224, a switch (SW11) 225, an inverter (INV) 226, and an input terminal 227.

The first transmission buffer 223 is configured by a CMOC buffer formed by a p-channel MOS (PMOS) transistor PT221 and an n-channel MOS (NMOS) transistor NT221. A source of the PMOS transistor PT221 is connected to a power supply potential Vdd, its drain is connected to a drain of the NMOS transistor NT221, and a source of the NMOS transistor NT221 is connected to a reference potential (ground potential) GND.

Gates of the PMOS transistor PT221 and the NMOS transistor NT221 are connected to each other, an input node ND221 is formed by a connection point thereof, an output node ND222 is formed by the connection point of drains of the PMOS transistor PT221 and the NMOS transistor NT221, and this output node ND222 is connected to the first output terminal 221.

The second transmission buffer 224 is configured by a CMOS buffer formed by a PMOS transistor PT222 and an NMOS transistor NT222.

A source of the PMOS transistor PT222 is connected to the power supply potential Vdd, its drain is connected to a drain of the NMOS transistor NT222, and a source of the NMOS transistor NT222 is connected to the reference potential (ground potential) GND.

Gates of the PMOS transistor PT222 and the NMOS transistor NT222 are connected to each other, an input node ND223 is formed by the connection point thereof, an output node ND224 is formed by the connection point of drains of the PMOS transistor PT222 and the NMOS transistor NT222, and this output node ND224 is connected to the second output terminal 222.

The switch 225 is connected at its fixed contact a to the input node ND221 of the transmission buffer 223, connected at its operation contact b to the output terminal of the inverter 226, and connected at its operation contact c to the input terminal 227 of the transmission side circuit 220.

The switch 225 is switched between the time of the card mode and the time of the reader/writer (R/W) mode by the mode control signal MD (Mode) of the control unit (CPU etc.) 117.

The fixed contact a and the operation contact c are connected in the card mode, and the fixed contact a and the operation contact b are connected in the reader/writer mode.

The input terminal of the inverter 226, the input node ND223 of the second transmission buffer 224, and the operation contact c of the switch 225 are connected to the input terminal 227.

The input terminal 227 is connected to the fixed contact a of the switch 270.

The switch 270 is specifically connected at its fixed contact a to the input terminal 227 of the transmission side circuit 220, connected at its operation contact b to the output terminal of the carrier generator 260, and connected at its operation contact c to the power supply potential Vdd.

The switch 270 is switched between the time of the card mode and the time of the reader/writer (R/W) mode by the mode control signal (Mode) of the control unit (CPU etc.) 117.

The fixed contact a and the operation contact c are connected in the card mode, while the fixed contact a and the operation contact b are connected in the reader/writer mode.

In the transmission side circuit 220 having such a configuration, in the card mode, the input terminal 227 is connected via the switch 270 to the power supply potential Vdd and fixed at the high (Hi) level, therefore the NMOS transistors NT221 and NT222 of the first and second transmission buffers 223 and 224 are held in the ON state, and the PMOS transistors PT221 and PT222 are held in the OFF state.

Due to this, the first and second output terminals 221 and 222 of the transmission side circuit 220 connected to the antenna circuit 210 are connected to the ground potential.

Accordingly, the antenna circuit 210 equivalently forms a parallel resonance circuit.

In the reader/writer mode, a carrier having the frequency of 13.56 MHz generated at the carrier generator 260 is supplied at the high (Hi) level or low (Lo) level via the switch 270 and the input terminal 227.

When the carrier is at the Hi level, the PMOS transistor PT221 is held in the ON state in the first transmission buffer 223 by the carrier via the inverter 226, and the NMOS transistor NT221 is held in the OFF state. In the second transmission buffer 224, the PMOS transistor PT222 is held in the OFF state, and the NMOS transistor NT222 is held in the ON state.

Due to this, the first output terminal 221 is connected to the power supply potential Vdd, and the second output terminal 222 is connected to the ground potential GND. Accordingly, the antenna circuit 210 will form a serial resonance circuit.

When the carrier is at the Lo level, due to the carrier via the inverter 226, in the first transmission buffer 223, the PMOS transistor PT221 is held in the OFF state, and the NMOS transistor NT221 is held in the ON state. In the second transmission buffer 224, the PMOS transistor PT222 is held in the ON state, and the NMOS transistor NT222 is held in the OFF state.

Due to this, the first output terminal 221 is connected to the ground potential GND, and the second output terminal 222 is connected to the power supply potential Vdd. Accordingly, the antenna circuit 210 will form a serial resonance circuit.

In this case, the carriers from the transmission buffers 223 and 224 of the transmission side circuit 220 are transferred from the control unit 117, ASK modulated by the transmission data TD supplied via the switch 250, and output from the first and second output terminals 221 and 223 to the antenna circuit 210.

In this way, in the communication device 200 of FIG. 5, the first and second transmission buffers 223 and 224 of the transmission side circuit 220 have the function of the circuit switch unit 280 forming the resonance circuit of the antenna circuit 210 as a parallel resonance circuit or serial resonance circuit.

Further, the communication device 200 of FIG. 5 is configured so as to ground the capacitor 212 of the antenna circuit 210 by utilizing switches NT221 and NT222 of the NMOS of the transmission buffers 223 and 224 used in the reader/writer mode.

Namely, terminals A and B in the figure of the antenna circuit 210 are connected to the transmission buffers 223 and 224 of the transmission side circuit 220 inside LSI, therefore, in the reader/writer mode, when the ON resistances of the transmission buffers 223 and 224 are ignored, the transmission buffers 223 and 224 alternately output 0V and the power supply potential Vdd of IC with respect to the antenna circuit 210.

Further, as explained above, in the card mode, the terminals will be grounded at the ground potential GND by turning ON the NMOS transistors NT221 and NT222.

Accordingly, in both of the reader/writer (R/W) mode and card mode, the terminal voltage of the IC is reliably contained within a range of from 0 to Vdd, and there is the major characteristic that the switch can be built-in in a low withstand voltage process.

The response circuit 230 performs load modulation of the response data read out from the memory unit 115 at the control unit 117 in the card mode and applies it to the node ND210 of the antenna circuit 210.

The reception side circuit 240 is used both as the reception circuit at the time of using the card function (card mode) and the reception circuit at the time of using the reader/writer function (reader/writer mode).

The reception side circuit 240 demodulates the information received at the time of the card function and the time of the reader/writer function and outputs the reception data RD to the control unit 117.

The switch 250 is connected at its fixed contact a to the supply line of the transmission data TD of the control unit 117, connected at its operation contact c to the input of the response (card) circuit 230, and connected in its operation contact b to the input terminal 227 of the transmission side circuit 220.

The switch 250 can be switched between the time of the card mode and the time of the reader/writer (R/W) mode by the mode control signal MD (Mode) of the control unit 117.

In the card mode using the card function, the switch 250 is switched at the fixed contact a to the connection with one operation contact c by the mode control signal MD, and the transmission data (response data) TD is input to the response (card) circuit 230, load modulated at the response (card) circuit 230, and applied to the antenna circuit 210.

On the other hand, in the reader/writer mode using the reader/writer function, the switch 250 is switched at its fixed contact a to the connection with the other operation contact b by the mode control signal MD, and the transmission data TD is supplied to the transmission side circuit 220.

The transmission data (TinA) is transmitted from the antenna circuit 210 via the transmission side circuit 220.

In this way, in the present embodiment, the antenna coil 211 and the capacitor 212 forming the antenna circuit 210 are used in both modes of the card mode and reader/writer mode.

In general, there are two resonance circuits: a resonance circuit dedicated to the card function and a resonance circuit dedicated to the reader/writer function, but in the present embodiment, by switching the resonance circuit at the circuit switch unit 280, a parallel resonance circuit at the time of the card function and a serial resonance circuit at the time of the reader/writer function are realized by the antenna coil 211 and the capacitor 212.

FIG. 5 shows a case where the transmission buffer of the transmission side circuit 220 is utilized when it is operated as the reader/writer (R/W) device and an example where two transmission buffers (Buff) are controlled by the same phase. This case is an example where the parallel resonance circuit is realized by turning ON the NMOS sides of the CMOS buffers.

Below, the operation of the communication device 200 will be explained focusing on the operation of the transmission side circuit 220.

In the card mode, the fixed contact a of the switch 225 of the transmission side circuit 220 is connected to the operation contact c by the mode control signal MD. At this time, the switch 250 of the communication device 200 is connected at its fixed contact a and operation contact c by the mode control signal MD.

At this time, the input terminal 227 of the transmission side circuit 220 is connected via the switch 270 to the power supply potential Vdd. Namely, the input terminal 227 is fixed at the Hi (high) level, and this signal of Hi level is supplied from the terminal c of the switch 225 via the terminal a to the gate of the NMOS transistor NT211 of the first transmission buffer 223, whereby the NMOS transistor NT221 becomes the ON state. At this time, the gate potential of the PMOS transistor PT221 configuring the CMOS buffer is high, so this becomes the OFF state.

On the other hand, a signal of the Hi level is supplied to the gate of the NMOS transistor NT222 of the second transmission buffer 224 which then becomes the ON operation state. The gate of the PMOS transistor PT222 configuring the CMOS inverter is at the high level, so becomes the OFF state.

As a result, the NMOS transistor NT221 of the transmission buffer 223 has become ON, therefore there is an ON resistance, but the second electrode side terminal A of the capacitor 212 is equivalently grounded.

Further, the other terminal of the antenna coil 211 also has an ON resistance, since the NMOS transistor NT222 of the transmission buffer 224 has become ON, but is equivalently grounded.

Accordingly, this means that the second electrode side terminal A of the capacitor 212 and the terminal B on the other side of the antenna coil 211 are alternately connected, and as a result, a parallel resonance circuit is formed.

When a parallel resonance circuit is formed by the capacitor 212 and the antenna coil 211, a signal from the outside is extracted by the resonance circuit and supplied to the reception side circuit 240. On the other hand, the carrier data processed at the response (card) circuit 230 and on which a signal (load modulated signal) is superimposed resonates in the parallel resonance circuit and is transmitted to the outside via the antenna coil 211 of the antenna circuit 210.

In this way, in the card mode, terminals A and B of the antenna circuit 210 are grounded by the NMOS transistors NT221 and NT222 of the transmission buffers 223 and 224 of the transmission side circuit 220 to form the parallel resonance circuit and to receive electromagnetic waves in the state where the impedance of the parallel resonance circuit is high.

Next, the operation in the reader/writer (R/W) mode will be explained.

In the reader/writer mode, the fixed contact a of the switch 225 of the transmission side circuit 220 is connected to the operation contact b by the mode control signal MD. At this time, the switch 250 of the communication device 200 connects the fixed contact a and operation contact b by the mode control signal MD. As a result, the transmission data TD is supplied to the transmission side circuit 220 for ASK modulation transferred from the control unit 117.

Further, the switch 270 connects the fixed contact a and the operation contact b by the mode control signal MD. Accordingly, the carrier generated at the carrier generator 260 is input to the input terminal 227 of the transmission side circuit 220.

Now assume that a carrier of the Hi (high) level is supplied to the input terminal 227 of the transmission side circuit 220. This carrier of the Hi level is input to the inverter 226. The output thereof becomes the Lo (low) level and is supplied to the gate of the PMOS transistor PT221 of the transmission buffer 223, whereby the PMOS transistor PT221 becomes the ON state. On the other hand, the gate of the NMOS transistor NT221 of the transmission buffer 223 is at the Lo level, so the transistor becomes the OFF state.

Further, the gate of the NMOS transistor NT222 of the transmission buffer 224 is at the Hi level, therefore the NMOS transistor NT222 becomes the ON state, and the PMOS transistor PT222 becomes the OFF state.

As a result, a high frequency current flows from the power supply through the source and drain of the PMOS transistor PT221 of the transmission buffer 223 to the capacitor 212 and the antenna coil 211 configuring the serial resonance circuit and further the drain and source of the NMOS transistor NT222 of the transmission buffer 224 and the GND. At this time, the electromagnetic wave induced by the high frequency current (signal) of the Hi level flowing in the antenna coil 211 is emitted, and the ASK modulated signal is transmitted to the external non-contact type IC card etc.

Next, assume the carrier of the Lo (low) level is supplied to the input terminal 227. When this carrier of the Lo level is input to the inverter 226 and the output thereof becomes the Hi (high) level and is supplied to the gate of the PMOS transistor PT221 of the transmission buffer 223, the PMOS transistor PT221 becomes the OFF state. On the other hand, the gate of the NMOS transistor NT221 of the transmission buffer 223 is at the Hi level, therefore the transistor becomes the ON state.

Further, the gate of the NMOS transistor NT222 of the transmission buffer 224 is at the Lo level, therefore the NMOS transistor NT222 becomes the OFF state, and the PMOS transistor PT222 becomes the ON state.

As a result, a high frequency current flows from the power supply through the source and drain of the PMOS transistor PT222 of the transmission buffer 224 in the antenna coil 211, the capacitor 212, and further the drain and source of the NMOS transistor NT221 of the transmission buffer 223 and the GND. At this time, an electromagnetic wave induced by the high frequency current (signal) of the Lo level flowing in the antenna coil 211 is emitted, and an ASK modulated signal is transmitted to the external non-contact type IC card etc.

In the reception operation, the capacitor 212 and the antenna coil 211 are connected in series with respect to the output terminals 221 and 222 of the transmission side circuit 220, the electromagnetic wave is serially resonated by the capacitor 212 and the antenna coil 21, and the signal is extracted and supplied to the reception side circuit 240.

In this way, in the reader/writer (R/W) mode, the MOS transistors of the CMOS inverter circuits forming the transmission buffers 223 and 224 are switched by the carrier, and the resonance circuit is configured as a serial resonance circuit.

Figure 6:
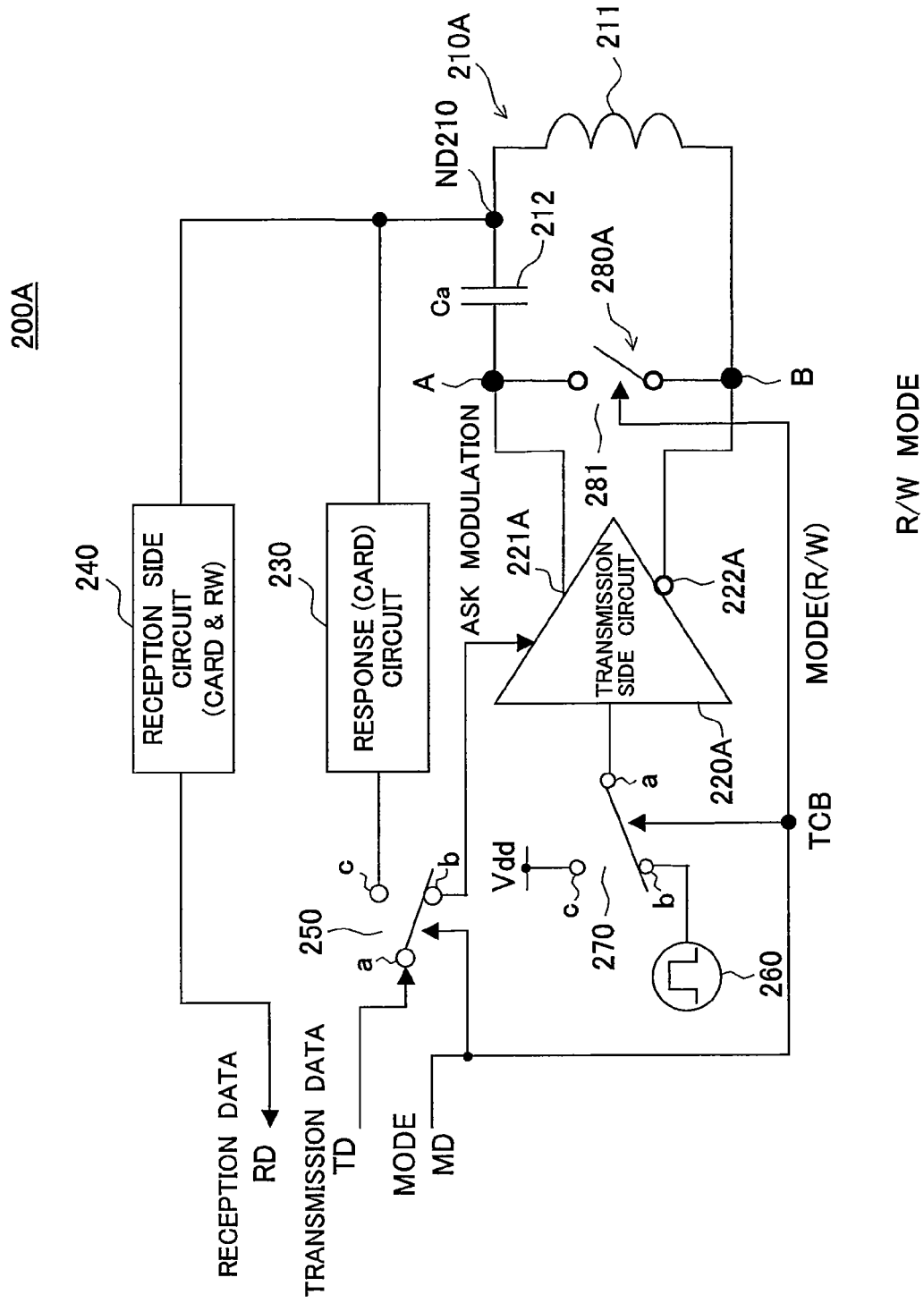
FIG. 6 is a diagram showing a second example of the configuration of a communication device having a built-in non-contact type IC card function and reader/writer function mounted in a mobile phone according to an embodiment of the present invention and shows the configuration in a reader/writer mode.
Figure 7:
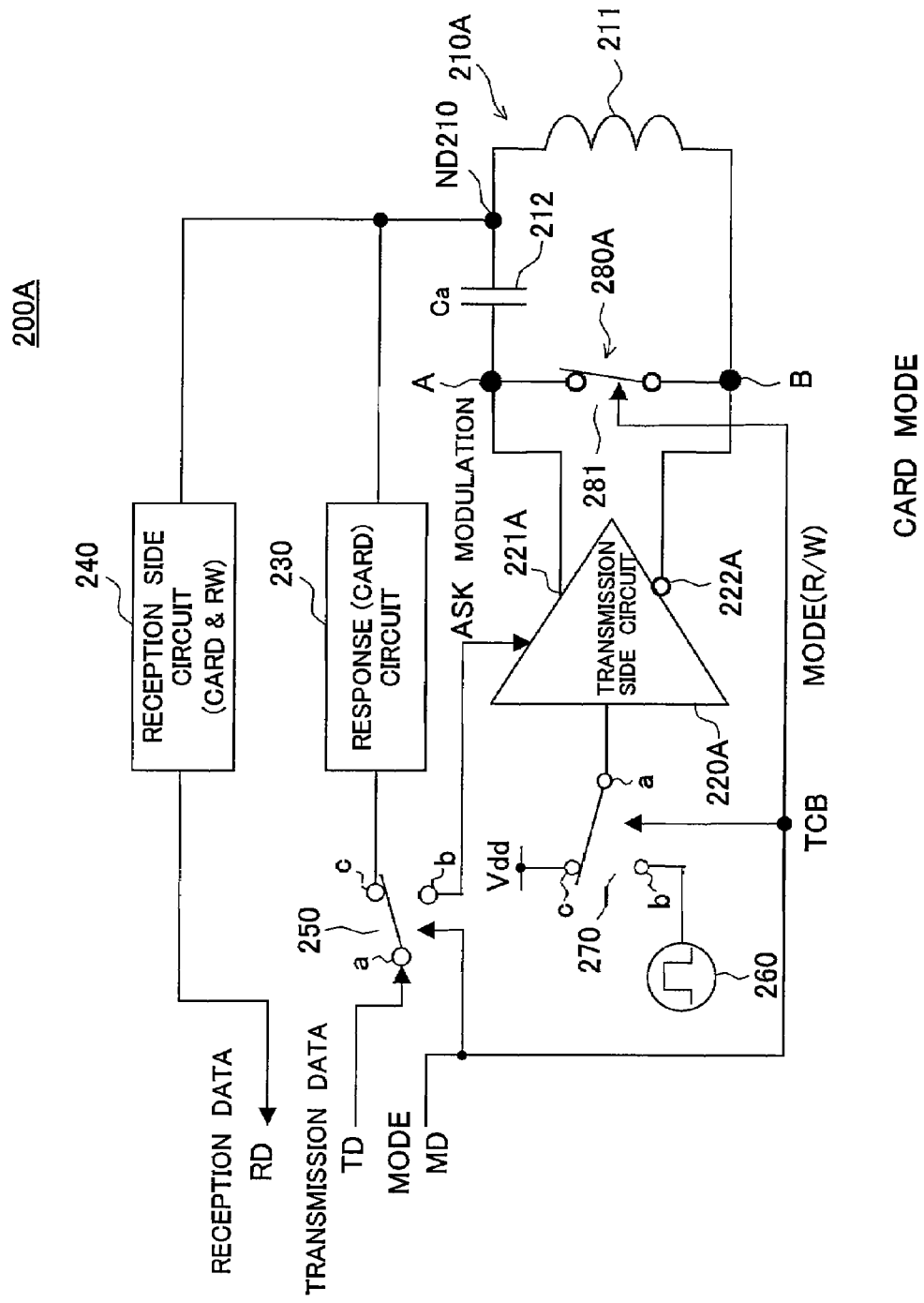
FIG. 7 is a diagram showing a second example of the configuration of a communication device having a built-in non-contact type IC card function and reader/writer function mounted in a mobile phone according to an embodiment of the present invention and shows the configuration in a card mode.

FIG. 6 and FIG. 7 are diagrams showing a second example of the configuration of a communication device having the built-in non-contact type IC card function and reader/writer function mounted in a mobile phone according to an embodiment of the present invention, in which FIG. 6 shows the configuration in the reader/writer mode, and FIG. 7 shows the configuration in the card mode.

The basic point of difference of a communication device 200A of FIG. 6 and FIG. 7 from the communication device 200 of FIG. 5 resides in the configuration of a circuit switch unit 280A in which a switch 281 is arranged between the terminal A and the terminal B of an antenna circuit 210A and the switch is made ON and OFF by the mode control signal MD.

Further, a transmission side circuit 220A has output terminals 221A and 222A having a positive phase and a negative phase.

Further, in this case as well, there are the major characteristics that in both of the reader/writer (R/W) mode and card mode, the terminal voltage of IC will be reliably contained within the range from 0 to Vdd and the switch can be built-in in a low withstand voltage process.

In the reader/writer (R/W) mode, the switches 250 and 270 are made to connect the fixed contact a and the fixed contact b by the mode control signal MD to input the transmission data and carrier to the transmission side circuit 220A, then the switch 281 of the circuit switch unit 280A is set to OFF to make the antenna circuit 210A a serial resonance circuit.

By configuring the antenna circuit 210A as a serial resonance circuit, the impedance becomes zero at the frequency of the carrier used in the transmission and reception, for example, 13.56 MHz, the current flowing in the antenna coil 211 becomes the maximum, the reception and transmission distances are increased, and the efficiency of reading/writing is improved.

As the switch 281 switching the resonance circuits, there are MOSFETs and other transistors, MEMS (Micro Electro Mechanical Systems), mechanical switches, etc.

At the time of reception (read mode) with respect to an external card, a load modulation signal from for example the external non-contact card is induced in the antenna coil 211, the induced signal is supplied to the reception side circuit 240, and data demodulation, data storage, etc. are carried out.

On the other hand, at the time of the transmission (write mode), the modulation circuit modulates the carrier is modulated by the recording data, and the modulated carrier is supplied via the transmission side circuit 220A to the serial resonance circuit of the capacitor 212 and antenna coil 211 of the antenna circuit 210. Then, the carrier is emitted via the antenna coil 211 and output to the external non-contact type IC card etc.

At this time, the capacitor 212 and antenna coil 211 configuring the antenna circuit 210 are in a serial resonance state at the used frequency, the impedance thereof are zero, and the current flowing in the antenna coil 211 becomes the maximum. As a result, the transmission efficiency rises, and the arrival distance of the electromagnetic wave is increased.

In the card mode, output terminals 221A and 222A having a positive phase and negative phase of the transmission side circuit 220A are set at HiZ (high impedance) and set so as not to exert an influence upon the antenna circuit 210A. Note that it is also possible to configure the system so that the output terminals 221A and 222A of the transmission side circuit 220A are set at LoZ (low impedance) having the same phase.

Namely, when the time of the card mode comes, the mode control signal MD is supplied from the control unit 117, the switch 281 of the circuit switch unit 280A becomes ON, and the output terminals 221A and 222A having the positive phase and negative phase of output of the transmission side circuit 220A are short-circuited.

As a result, in the antenna circuit 210A, a parallel resonance circuit is formed by the capacitor 212 and the antenna coil 212. Further, in parallel to this, the switch 250 switches to the connection of the fixed contact a and the operation contact c, and transmission data (response data) TD is supplied to the response (card) circuit 220.

In such a configuration, the signal transmitted from for example an external reader/writer device resonates in the parallel resonance circuit of the antenna coil 211 and the capacitor 212, and the signal extracted there is input to the reception side circuit 240. At this time, the output terminals 221A and 222A of the transmission side circuit 220A are short-circuited, therefore no signal is output from the transmission side circuit 220A or the operation of the transmission side circuit 220A is suspended.

In the reception side circuit 240, the demodulation circuit extracts the transmission signal (information) of the reader/writer device acted from the received magnetic field the same as that described above, decodes it, and outputs it to a control unit 117 such as a CPU.

This control unit 117 processes the decoded data and further stores and reads data to/from the memory unit 115 or encodes data read out from the memory unit 115. This transmission data is modulated in load in the response circuit 230 with respect to the carrier signal from the reader/writer device.

In this way, in the present example, when used as a card, as shown in FIG. 7, the switch 281 of the circuit switch unit 280A is made ON, the antenna coil 211 and capacitor 212 have the circuit configuration of parallel connection, and simultaneously the front end is given relatively a high impedance, to thereby satisfy the card function even with a further distance.

Note that, the reception side circuit 240 may separately form a reception side circuit dedicated to the card mode and a reception side circuit dedicated to the reader/writer mode.

Figure 8:
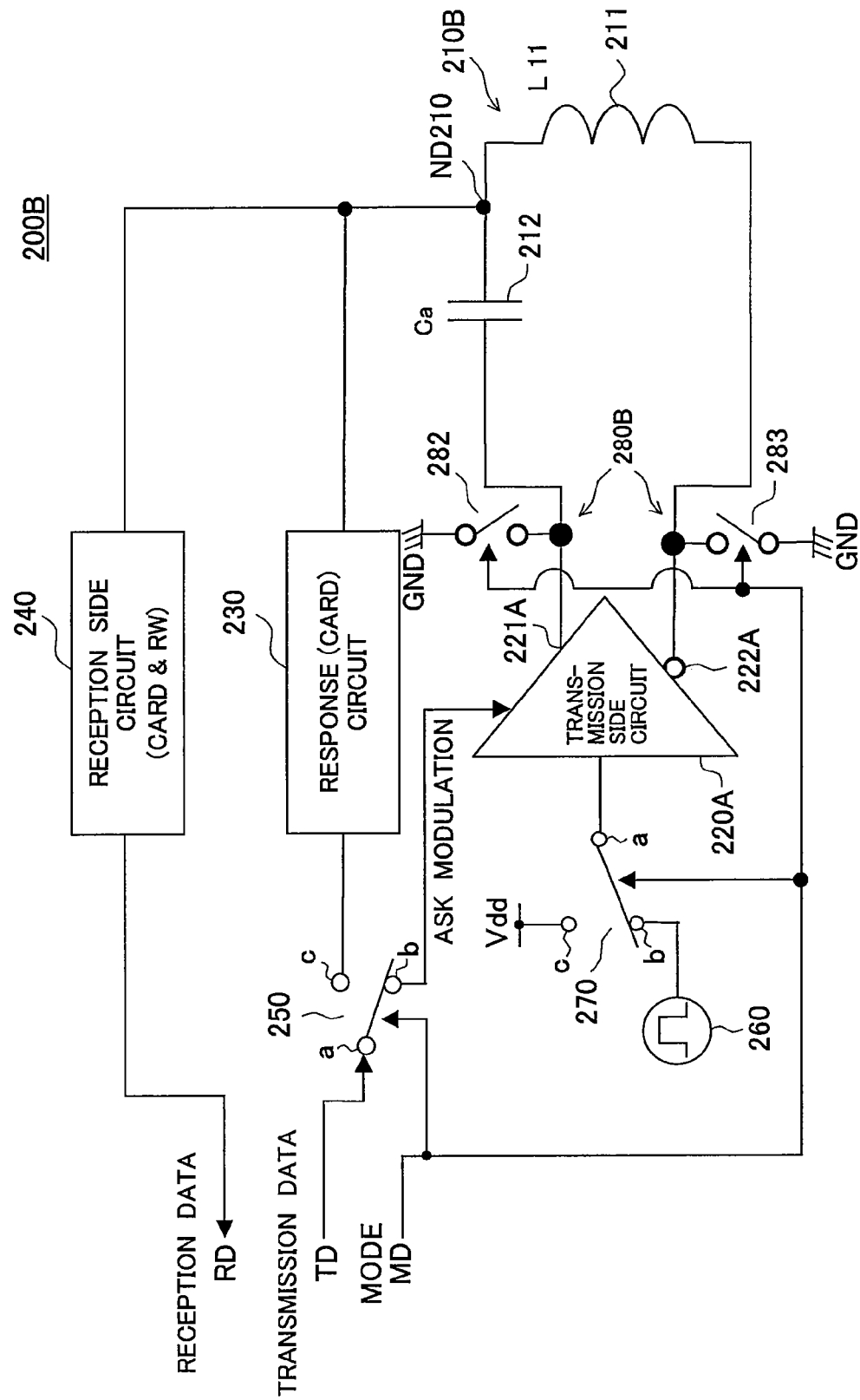
FIG. 8 is a diagram showing a third example of the configuration of a communication device having a built-in non-contact type IC card function and reader/writer function mounted in a mobile phone according to an embodiment of the present invention.

FIG. 8 is a diagram showing a third example of the configuration of a communication device having a built-in non-contact type IC card function and reader/writer function mounted in a mobile phone according to an embodiment of the present invention.

The difference of a communication device 200B of FIG. 8 from the communication device 200A of FIG. 6 and FIG. 7 resides in a circuit switch unit 280B in which switches 282 and 283 for selectively connecting the terminal A and the terminal B to the ground potential by a mode control signal MD in place of arranging the switch 281 between the terminal A and the terminal B of the antenna circuit 210B.

In such a configuration, in the reader/writer mode, the circuits operate in the state where the switches 282 and 283 of the circuit switch unit 280B are set OFF (open) by the mode control signal MD. At this time, a serial resonance circuit is formed in the antenna circuit 210B.

At the time of transmission, the transmission data and carrier are input to the transmission side circuit 220A. The carrier is ASK modulated by the transmission data by the transmission side circuit 220A (modulation circuit), and the carrier modulated to a signal serially resonates in the capacitor 212 and antenna coil 211 of the antenna circuit 210B and transmitted via the antenna coil 211.

On the other hand, at the time of reception, the transmission side circuit 220A outputs a constant carrier, and the load modulated signal is supplied from an external non-contact type IC card to the reception side circuit 240.

The basic operation after that is the same as that in FIG. 7, therefore a detailed explanation will be omitted.

In this way, when the device functions as the reader/writer device, switches 282 and 283 connected to the resonance circuits of the antenna circuit 210B are switched, and in this case, made open, and thereby configure the serial resonance circuits.

Next, the operation of the communication device 200B when operating as the card mode will be explained.

In the card mode, the switches 282 and 283 of the circuit switch unit 280B are set ON by the mode control signal MD, the positive phase (terminal) 221A of the transmission side circuit 220A is connected to the ground potential GND, and the inverse phase output (terminal) 222A is connected to the ground potential GND in parallel to this.

As a result, first side ends A and B of the capacitor 212 and antenna coil 211 of the antenna circuit 210B are grounded, and a parallel resonance circuit is equivalently formed.

Then, the common connection point of the capacitor 212 and the antenna coil 211, that is, the node ND210, is connected to the card reception use reception side circuit 240, so the device is set so as to operate as a card function.

When a signal is supplied from the external reader/writer device etc., a signal is induced at the antenna coil 211, a signal of the resonance frequency is extracted in the parallel resonance circuit of the capacitor 212 and antenna coil 211, and the signal is input to the reception side circuit 240. The operation after that is the same as that explained above, so omitted here.

On the other hand, at the time of response, the switch 250 is switched to the connection of the fixed contact a and the operation contact c by the mode control signal MD, the transmission data is supplied to the response circuit 230, and load modulation is carried out with respect to the carrier from the reader/writer device.

In this way, when the device functions as a card device, the switches 282 and 283 connected to the resonance circuits of the circuit switch unit 280B are switched, i.e., short-circuited in this case, to thereby configure a parallel resonance circuit.

Figure 1:
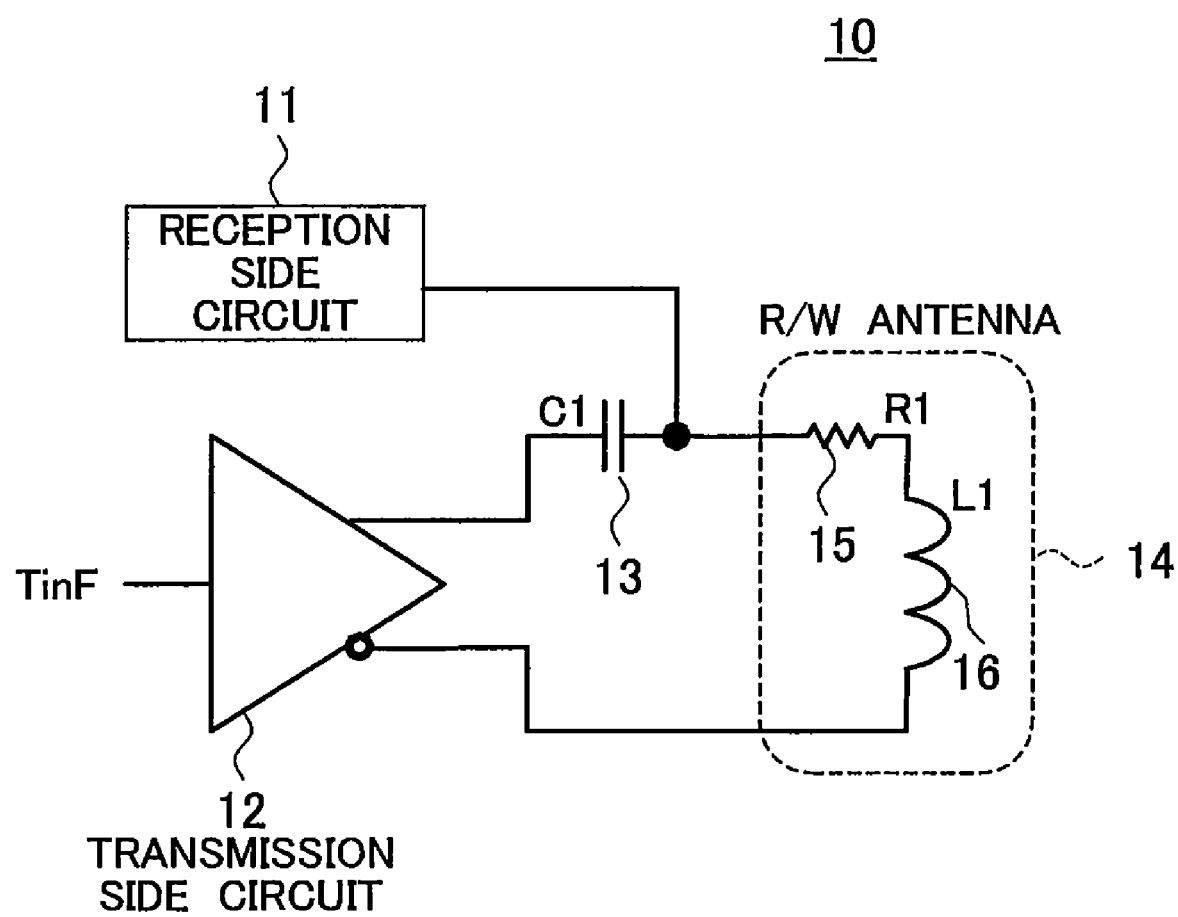
FIG. 1 is a diagram showing the configuration of a front end circuit of a general non-contact type IC card use R/W (reader/writer) device.
Figure 2:
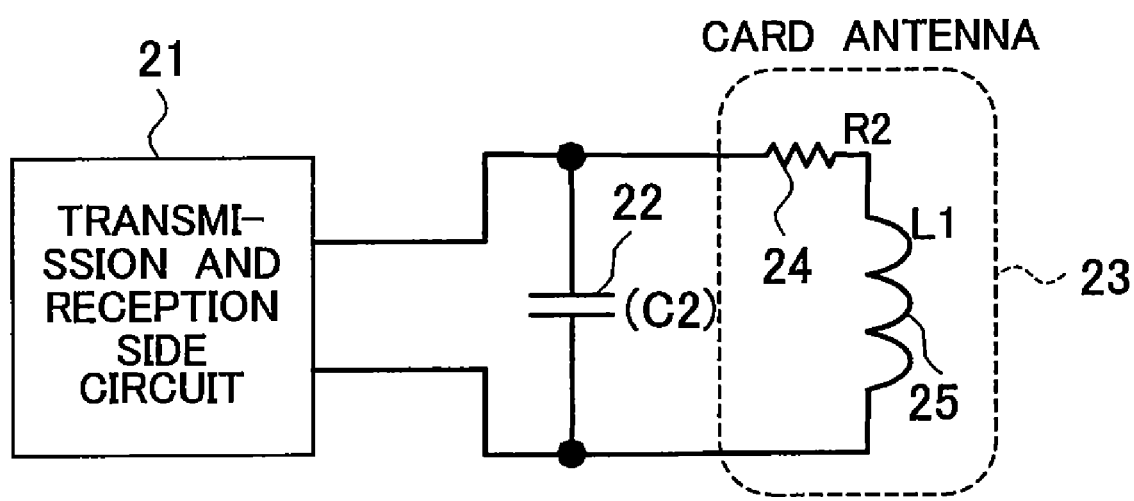
FIG. 2 is a diagram showing the configuration of principal parts of the front end circuit used in the non-contact type IC card.

Note that the explanation hitherto was for the case where the ON resistance of the switch was 0'Ω, but in actuality, there is a certain degree of ON resistance. For this reason, when the ON resistance of the switch is large, it enters in series with the antenna coil and lowers the reception efficiency in the card mode. This becomes equivalent with the case where the resistance of R1 is large in FIG. 1.

For this reason, it is possible to use the capacitor 213 parallel to the antenna coil 211 and the capacitor 213 serial to the antenna coil 211 in combination.

Figure 9:
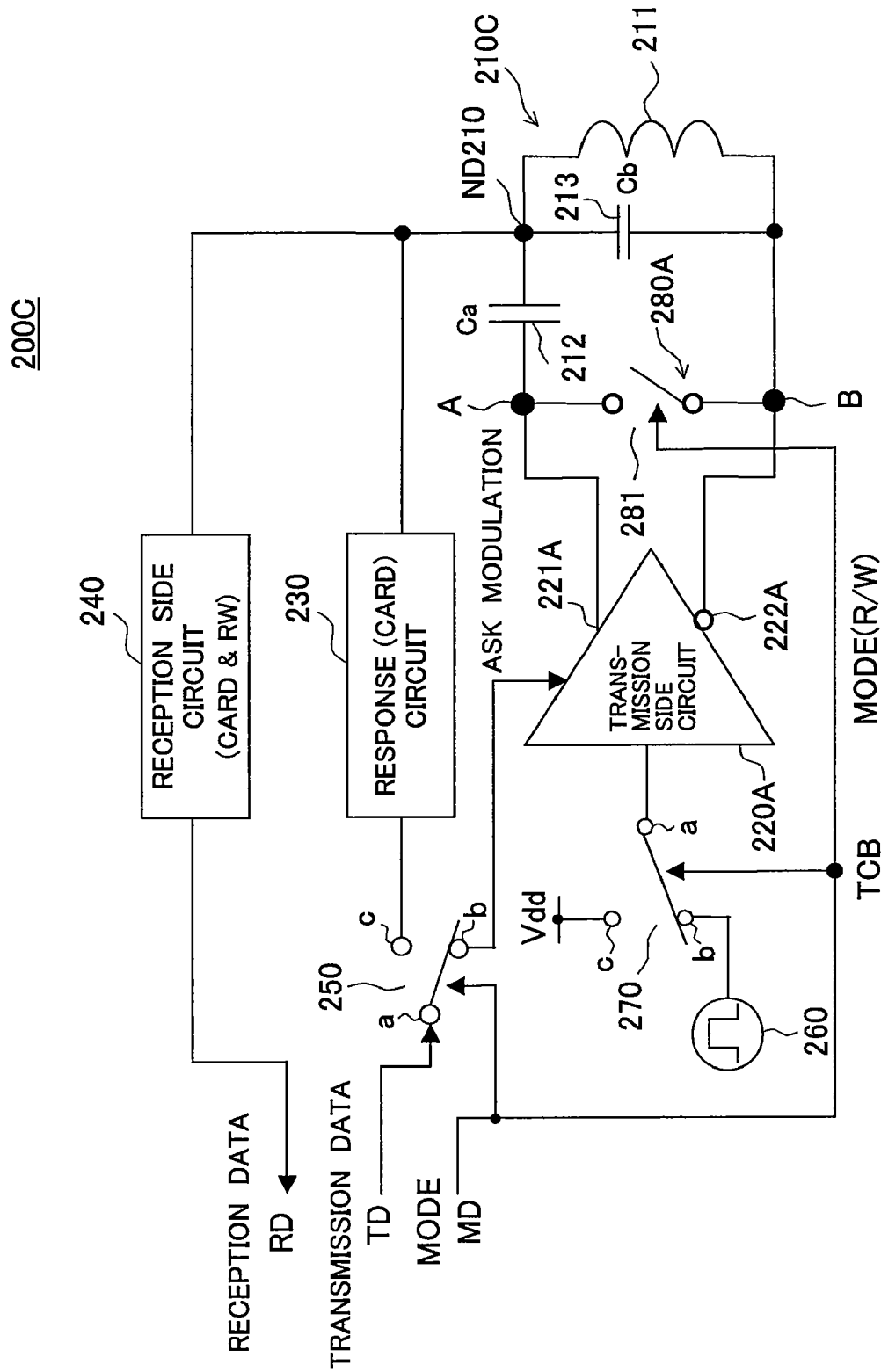
FIG. 9 is a diagram showing a fourth example of the configuration of a communication device having a built-in non-contact type IC card function and reader/writer function mounted in a mobile phone according to an embodiment of the present invention.

FIG. 9 is a diagram showing a fourth example of the configuration of a communication device having a built-in non-contact type IC card function and reader/writer function mounted in a mobile phone according to an embodiment of the present invention.

The difference of a communication device 200C of FIG. 9 from the communication device 200A of FIG. 7 resides in that a capacitor 213 having a capacitance Cb is connected in parallel with respect to the antenna coil 211 in an antenna circuit 210C.

In the antenna circuit 210A of the communication device 200A shown in FIG. 6 and FIG. 7, no capacitor 213 connected in parallel to the antenna coil 211 is provided.

In the communication device 200C of FIG. 9, by adjusting the capacitance Cb of the capacitor 213 and the capacitance Ca of the capacitor 212, at the resonance frequency, even when there is an ON resistance in series to the antenna coil 211, the card function and the reader/writer function are satisfied.

The configuration other than the antenna circuit 210C is the same as that of FIG. 6 and FIG. 7, therefore a detailed explanation thereof will be omitted.

The positive phase output terminal 221A of the transmission side circuit 210A is connected to one terminal A of the capacitor 212, while the inverse phase terminal 222A is connected to the other terminal B of the antenna coil 211 and one terminal (first electrode) of the capacitor 213. Further, the other terminal (second electrode) of the capacitor 213 is connected to the node ND210.

Here, the reception side circuit 240 may be either of the reader/writer or card use, but the explanation will be given of the card use reception side circuit for convenience.

The switch 281 of the circuit switch unit 280A is connected between the positive phase output terminal 221A and the inverse phase terminal 222A of the transmission side circuit 220A, the switch 271 is made ON or OFF in accordance with the reader/writer mode or card mode, and the antenna circuit 210C is set at either of a parallel resonance circuit or serial resonance circuit.

At the time of the reader/writer mode, the switch 281 is set at OFF by the mode control signal MD, and a serial resonance circuit is formed in the antenna circuit 210C.

The carrier flows via the transmission side circuit 220A in the capacitor 212 and antenna coil 211 of the antenna circuit 210C and further the capacitor 213 and is transmitted as an electromagnetic wave from the antenna coil 211, whereby a read operation is carried out.

On the other hand, the signal input from the antenna coil 211 is extracted at the antenna coil 211 and the capacitor 213 and the capacitor 212 configuring the serial resonance circuit, and the extracted signal is supplied to the reception side circuit 240, where a reception operation is carried out.

Further, in the card mode, the switch 281 is set in the ON state, and a parallel resonance circuit is formed by the capacitor 212, the capacitor 213, and the antenna coil 211. The transfer of data with the reception side circuit 240 of the card is carried out by using the parallel resonance circuit. This operation is the same as the operation explained in FIG. 6, FIG. 7, FIG. 8 etc., therefore a detailed explanation will be omitted.

Next, the input impedance of the antenna circuit 210C including the antenna coil 211 in the card mode and reader/writer mode will be explained.

Figure 10:
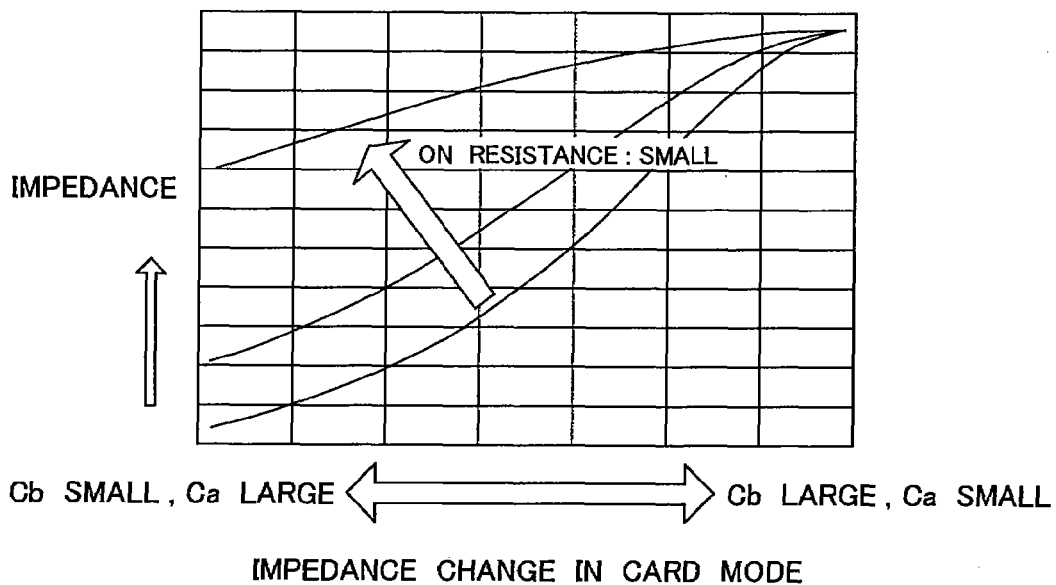
FIG. 10 is a diagram showing simulation results of the communication device shown in FIG. 9.
Figure 11:
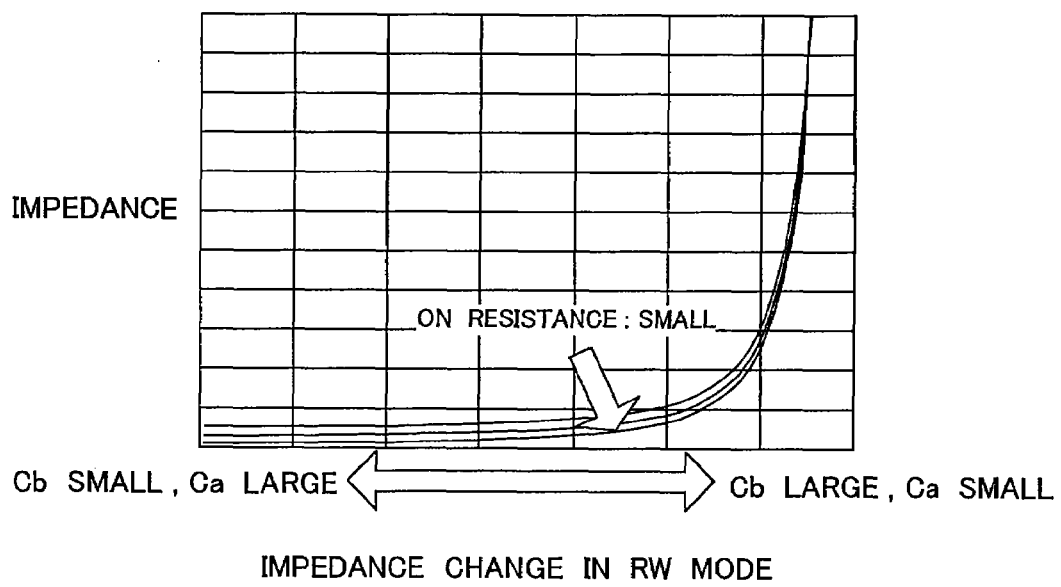
FIG. 11 is a diagram showing simulation results of the communication device shown in FIG. 9.

FIG. 10 and FIG. 11 shown below show the impedance characteristics in the card mode and reader/writer mode. These values were changed and the impedances were computed under the condition that the sum of the capacitances of the capacitors 212 and 213, i.e., (Ca+Cb) became constant.

First, in the card mode, the switch 281 is set to ON and a parallel resonance circuit is formed.

Now assuming that there is an ON resistance in the switch 281, the relative values of the results of simulation for the impedances of that circuit are shown in FIG. 10. The capacitance values when changing the capacitances Ca and Cb of the capacitors 212 and 213 are plotted on the abscissa of FIG. 10, and the impedance Z of any scale is plotted on the ordinate.

In FIG. 10, when the capacitance Cb of the capacitor 213 is made small and the capacitance Ca of the capacitor 212 is made large, generally the impedance Z becomes small. This is not suited to the card mode.

Contrary to this, when the capacitance Ca of the capacitor 212 is made small and the capacitance Cb of the capacitor 213 is made large, the impedance Z becomes large. This is suited to the card mode, but when the ON resistance of the switch is large, the impedance is lowered, and the reception efficiency is lowered. It is seen that when the ON resistance is large, the values of capacitances Ca and Cb have a large influence upon the impedance.

Next, the change of the impedance in the reader/writer mode will be explained.

At this time, the switch 281 is set in the OFF state. The capacitance Ca of the capacitor 212 and the capacitance Cb of the capacitor 213 are adjusted to adjust the impedance.

The impedance Z of the serial resonance circuit was simulated for data obtained by adjusting the capacitances Ca and Cb of the capacitors 212 and 213 shown in FIG. 9 to change the ON resistance. The relative values of the results of the simulation are shown in FIG. 11.

In FIG. 11, the abscissa indicates the values when changing the capacitances Ca and Cb of the capacitors 212 and 213, and the ordinate indicates the value of the impedance Z of the serial resonance circuit by any scale.

As a result of the simulation, in a serial resonance circuit, when the capacitance Cb of the capacitor 213 is small and the capacitance Ca of the capacitor 212 is large, the impedance Z is small, which is suited to the reader/writer mode, but when the ON resistance of the switch 281 becomes large, the impedance becomes large, and the transmission efficiency of the reader/writer is lowered.

Along with the capacitance Cb of the capacitor 213 becoming large and then the capacitance Ca of the capacitor 212 becoming small, the impedance becomes large. When exceeding a certain range, the impedance Z abruptly becomes large. This is not suited to the reader/writer.

From this result, it is necessary to select a range where the impedance Z of the serial resonance circuit of FIG. 11 is small and the impedance Z of the parallel resonance circuit of FIG. 10 is large, but due to the influence of the ON resistance of the switch 281, it is necessary to select the optimum values of Ca and Cb while watching the performances of the card and the reader/writer.

Namely, the simulation results of FIG. 10 and FIG. 11 explained above show the impedance characteristics of the card mode and reader/writer mode. In contrast to the fact that in the card mode, the influence of the ON resistance is smaller and also the impedance becomes higher when the capacitance Cb of the capacitor 213 is larger, in the reader/writer mode, the impedance is smaller and more useful when the capacitance Cb of the capacitor 213 is smaller.

For this reason, it is necessary to set optimum capacitances Ca and Cb of the capacitors 212 and 213 in order to satisfy both functions. Further, when the ON resistance is made small, it becomes also possible to omit the capacitor 213 in the card mode.

Figure 12:
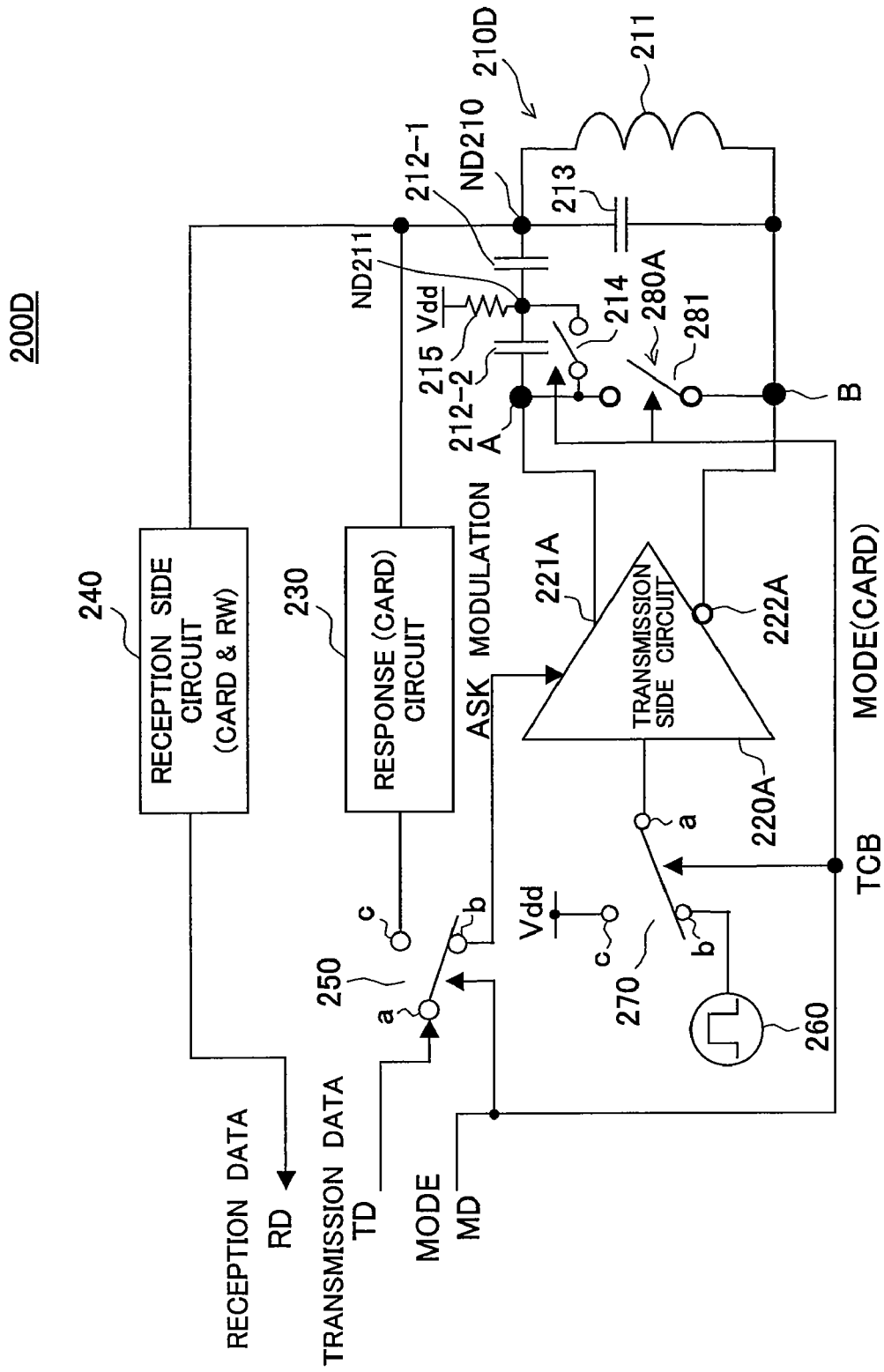
FIG. 12 is a diagram showing a fifth example of the configuration of a communication device having a built-in non-contact type IC card function and reader/writer function mounted in a mobile phone according to an embodiment of the present invention.

FIG. 12 is a diagram showing a fifth example of the configuration of a communication device having a built-in non-contact type IC card function and reader/writer function mounted in a mobile phone according to an embodiment of the present invention.

The difference of a communication device 200D of FIG. 12 from the communication device 200C of FIG. 9 resides in that two capacitors 212-1 and 212-2 are connected in series in place of connecting one capacitor 212 between the node ND210 and the terminal A, a switch 214 made ON/OFF by the mode control signal MD is connected between the connection node ND211 of the two capacitors 212-1 and 212-2 and the terminal A, and the node ND211 is connected via a high resistance 215 to the power supply potential Vdd.

By employing such a configuration, in the communication device 200C of FIG. 9, the tuning frequency becomes high even at the time of the card function, therefore, in the present communication device 200D, the tuning frequency is switched between the time of the card mode and the time of the reader/writer mode to thereby make characteristics in the card mode and in the reader/writer mode equivalent.

The communication device 200D of FIG. 12 is configured so that, in the card mode, the capacitor 212-2 between the serial capacitors 212-1 and 212-2 is bypassed by the switch 214 so as not to contribute to the tuning.

The operation will be simply explained next.

In the card mode, the switch 214 and the switch 281 of the circuit switch unit 280A are set ON by the mode control signal MD.

Accordingly, in the antenna circuit 210A, a parallel resonance circuit is formed by the antenna coil 211 and the capacitors 221-1 and 213. Only the capacitor 212-1 between the serial capacitors 212-1 and 212-2 contributes to the tuning.

In the reader/writer mode, the switch 214 and the switch 281 of the circuit switch unit 280A are set OFF by the mode control signal MD.

In this case, a serial capacitance Ct of the capacitor 212-1 having a capacitance Ct1 and the capacitor 212-2 having a capacitance Ct2 is obtained. Then, a serial resonance circuit is formed by the antenna coil 211 and the capacitors 212-1, 212-2, and 213.

In this case, the node ND211 is biased by the high resistance 215, therefore a potential Vrpd thereof becomes Vdd.

Then, the potential Vrpd of the node ND211 becomes lower than a potential Vrx of the node ND210 by exactly the amount of the divided voltage of the capacitors 212-1 and 212-2.

The potential of the node ND210 and the values of the capacitances Ct1 and Ct2 of the capacitors 212-1 and 212-2 are selected so that the above divided voltage becomes within a permissible voltage range.

According to the communication device 200D of FIG. 12, it becomes possible to configure a mobile phone apparatus provided with a communication device having good characteristics at both of the time of card mode and time of reader/writer mode by switching the tuning frequency between the time of the card mode and the time of the reader/writer mode.

Figure 13:
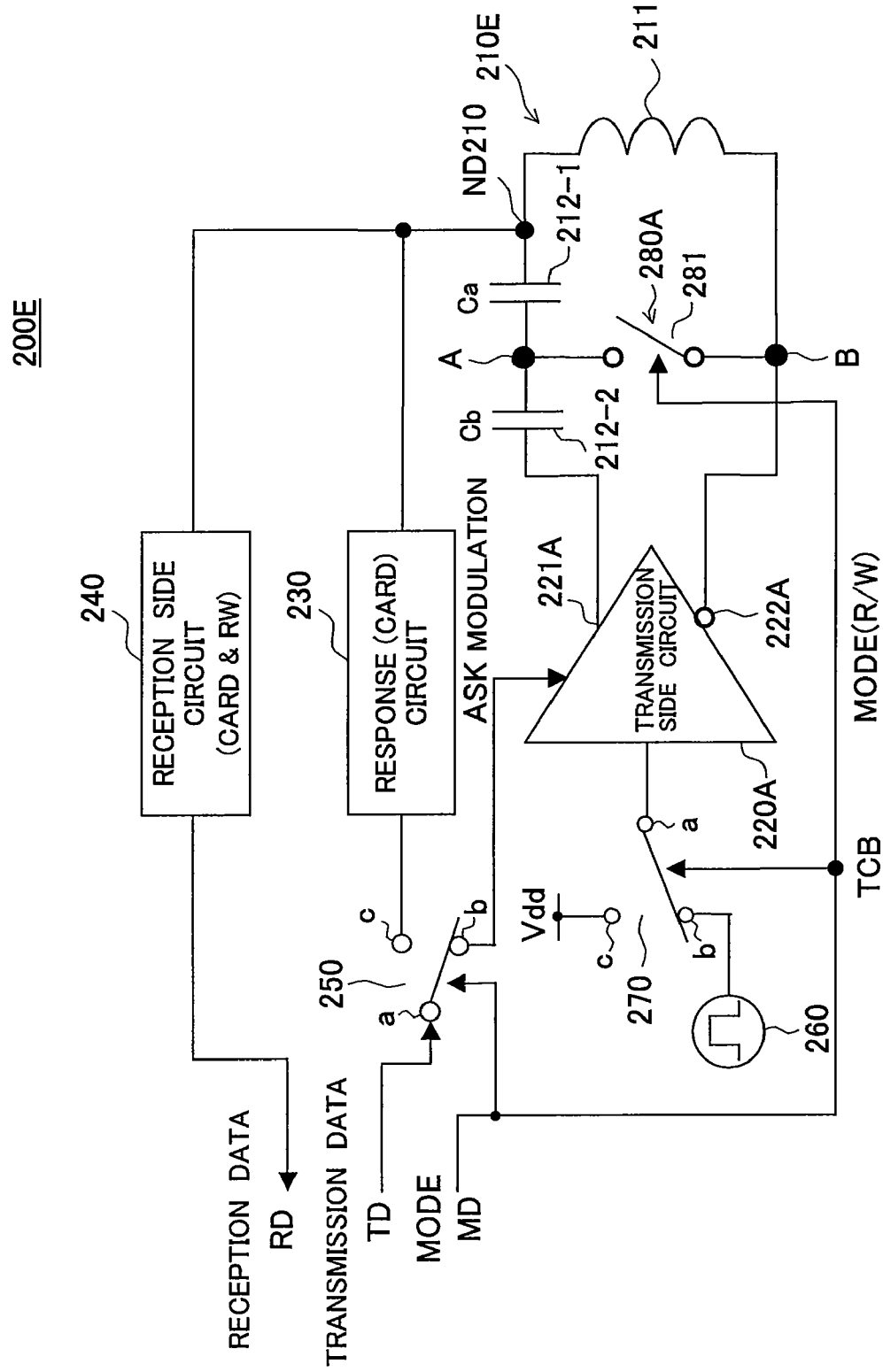
FIG. 13 is a diagram showing a sixth example of the configuration of a communication device having a built-in non-contact type IC card function and reader/writer function mounted in a mobile phone according to an embodiment of the present invention.

FIG. 13 is a diagram showing a sixth example of the configuration of a communication device having a built-in non-contact type IC card function and reader/writer function mounted in a mobile phone according to an embodiment of the present invention.

The difference of a communication device 200E of FIG. 13 from the communication device 200A of FIG. 6 and FIG. 7 resides in that another capacitor 212-2 having the capacitance Cb is further connected between the terminal A and the first output terminal 221A of the transmission side circuit 220A in place of connecting one capacitor 212 between the node ND 210 and the terminal A.

The communication device 200E of this example is configured so that, in the same way as the communication device 200D of FIG. 12, the tuning frequency in the reader/writer mode becomes higher than the card mode.

In the reader/writer mode, the switch 281 is set OFF by the mode control signal MD. As a result, the two capacitors 212-1 and 212-2 are serially connected, and the total capacitance Ctotal thereof is given by the following equation and becomes small.

[Equation 6]

$$C\text{total} = 1/((1/Ca) + (1/Cb)) \tag{6}$$

Accordingly, the resonance frequency fo in the reader/writer mode rises as in the following equation.

[Equation 7]

$$fo = 1/(2\pi\sqrt{(L*C\text{total})}) \tag{7}$$

In the card mode, the switch 281 is set ON by the mode control signal MD, therefore the resonance frequency is determined according to the capacitance Ca of the capacitor 212-1 and the inductance L11 of the antenna coil 211.

According to the communication device 200E of FIG. 13, it becomes possible to configure a mobile phone apparatus provided with a communication device having good characteristics at both of the time of the card mode and the time of the reader/writer mode by switching the tuning frequency between the time of the card mode and the time of the reader/writer mode.

Figure 14:
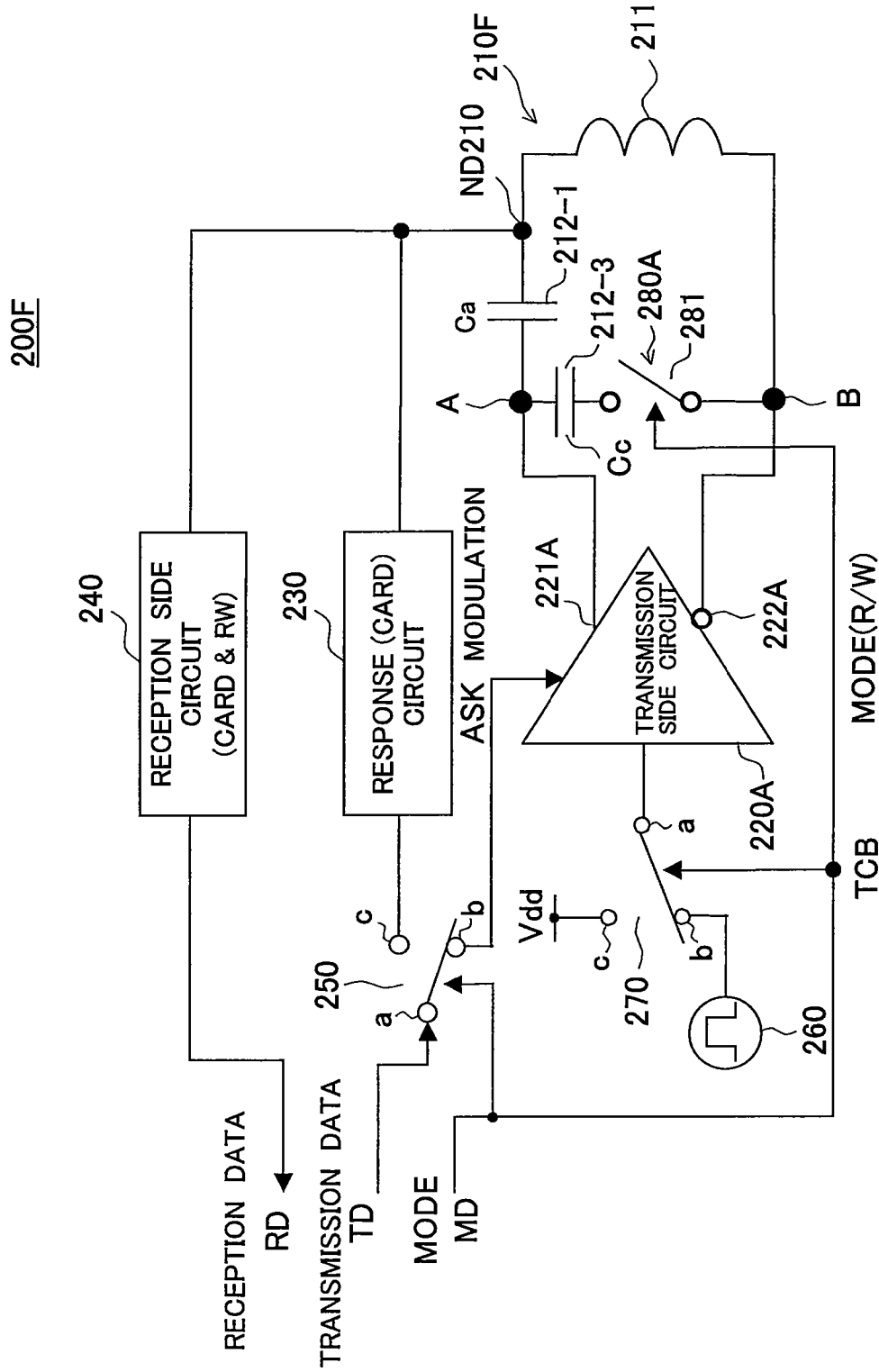
FIG. 14 is a diagram showing a seventh example of the configuration of a communication device having a built-in non-contact type IC card function and reader/writer function mounted in a mobile phone according to an embodiment of the present invention.
Figure 15:
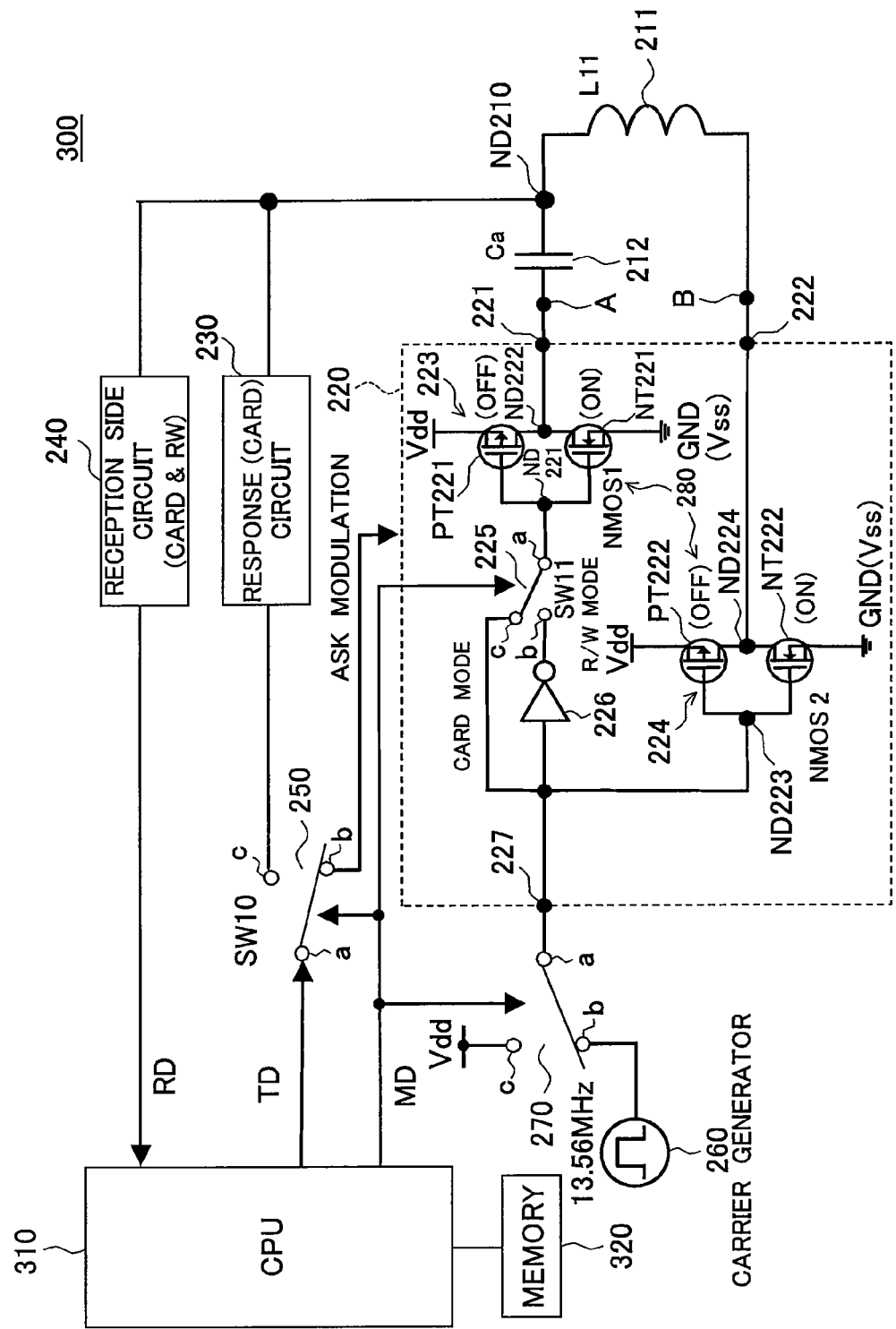
FIG. 15 is a diagram showing an example of the configuration of a non-contact type IC card mounting the communication device of FIG. 5 thereon.
Figure 16:
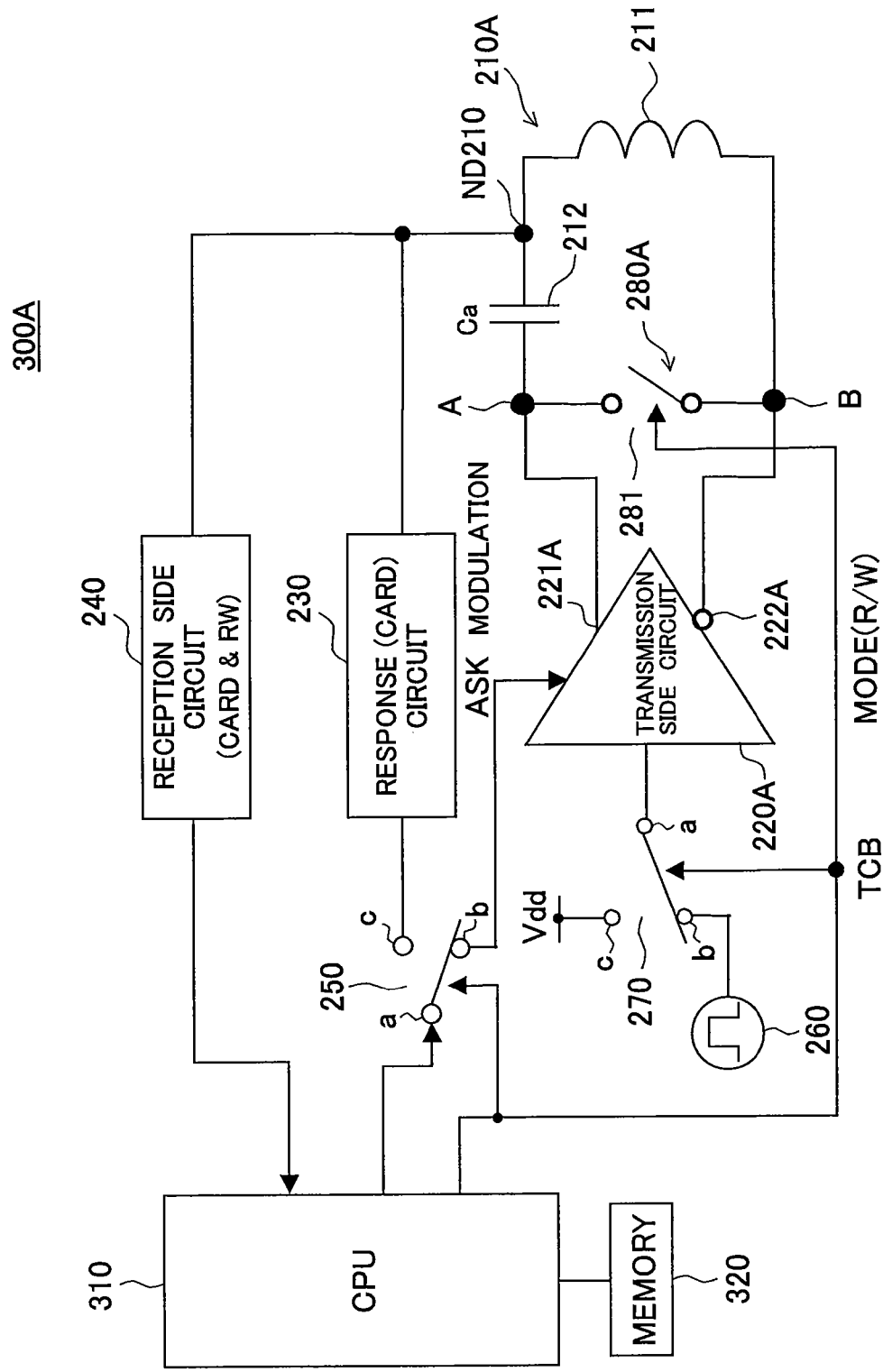
FIG. 16 is a diagram showing an example of the configuration of a non-contact type IC card mounting the communication device of FIG. 5 or FIG. 6 thereon.
Figure 17:
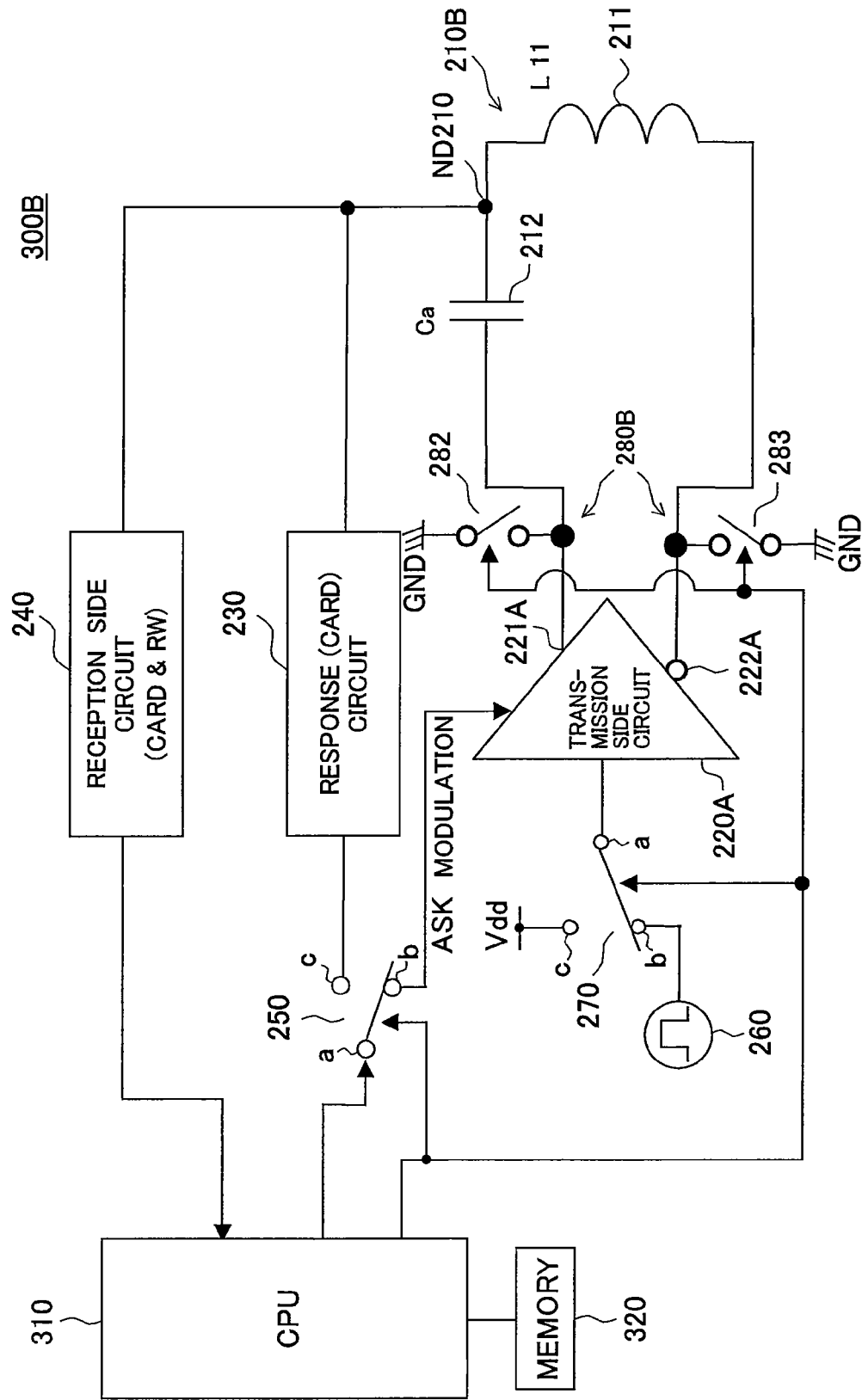
FIG. 17 is a diagram showing an example of the configuration of a non-contact type IC card mounting the communication device of FIG. 8 thereon.
Figure 18:
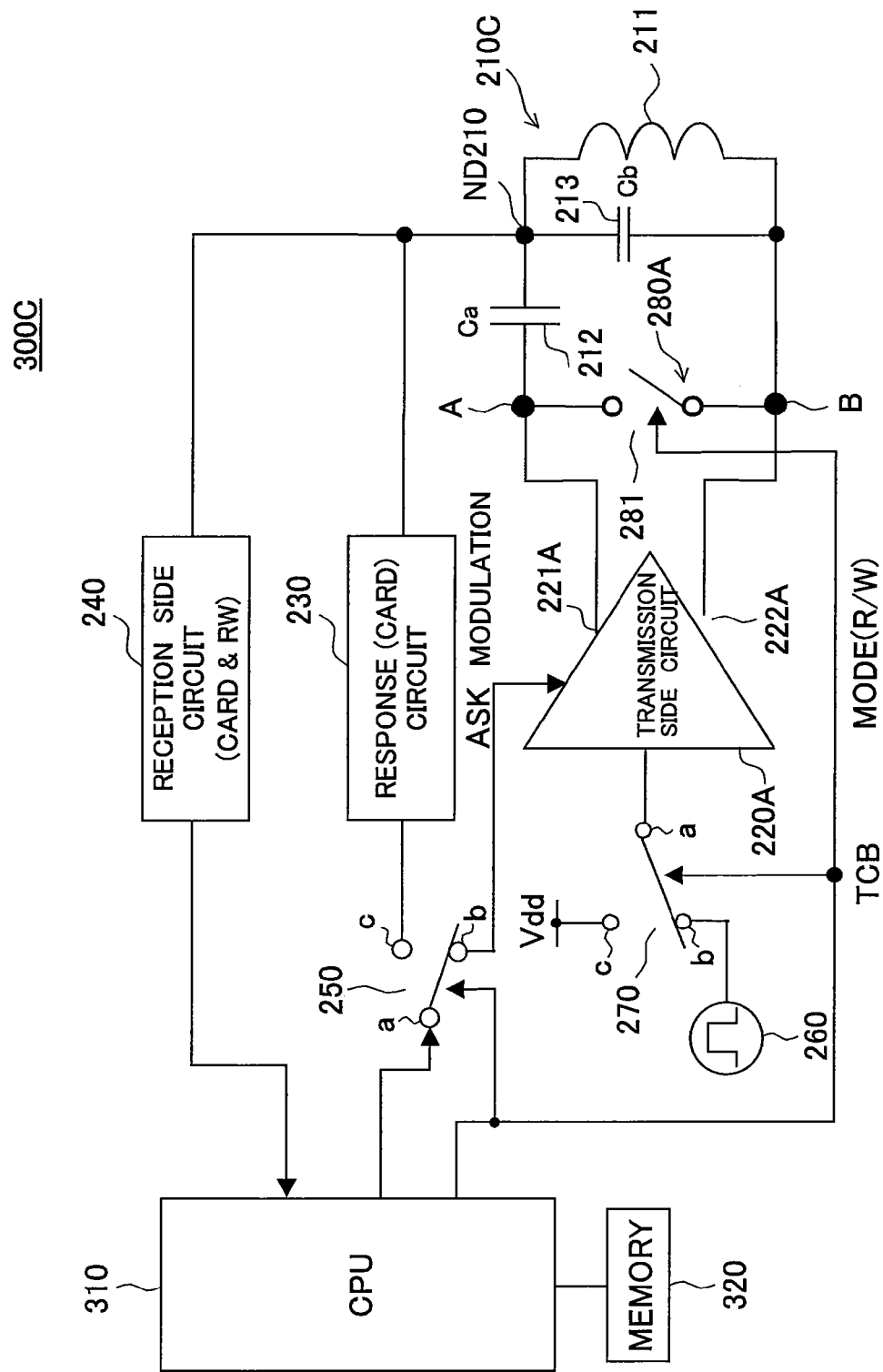
FIG. 18 is a diagram showing an example of the configuration of a non-contact type IC card mounting the communication device of FIG. 9 thereon.
Figure 19:
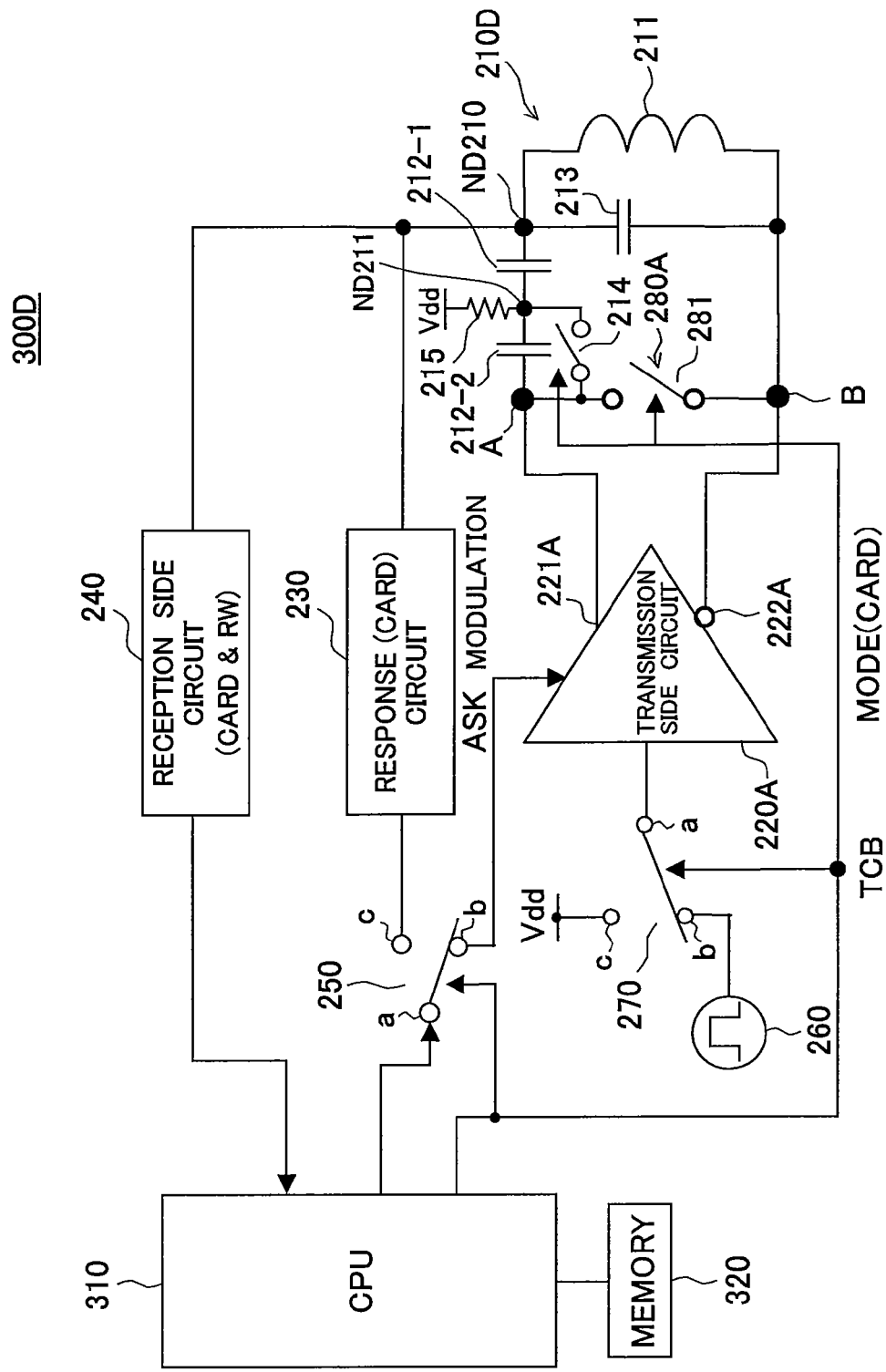
FIG. 19 is a diagram showing an example of the configuration of a non-contact type IC card mounting the communication device of FIG. 12 thereon.
Figure 20:
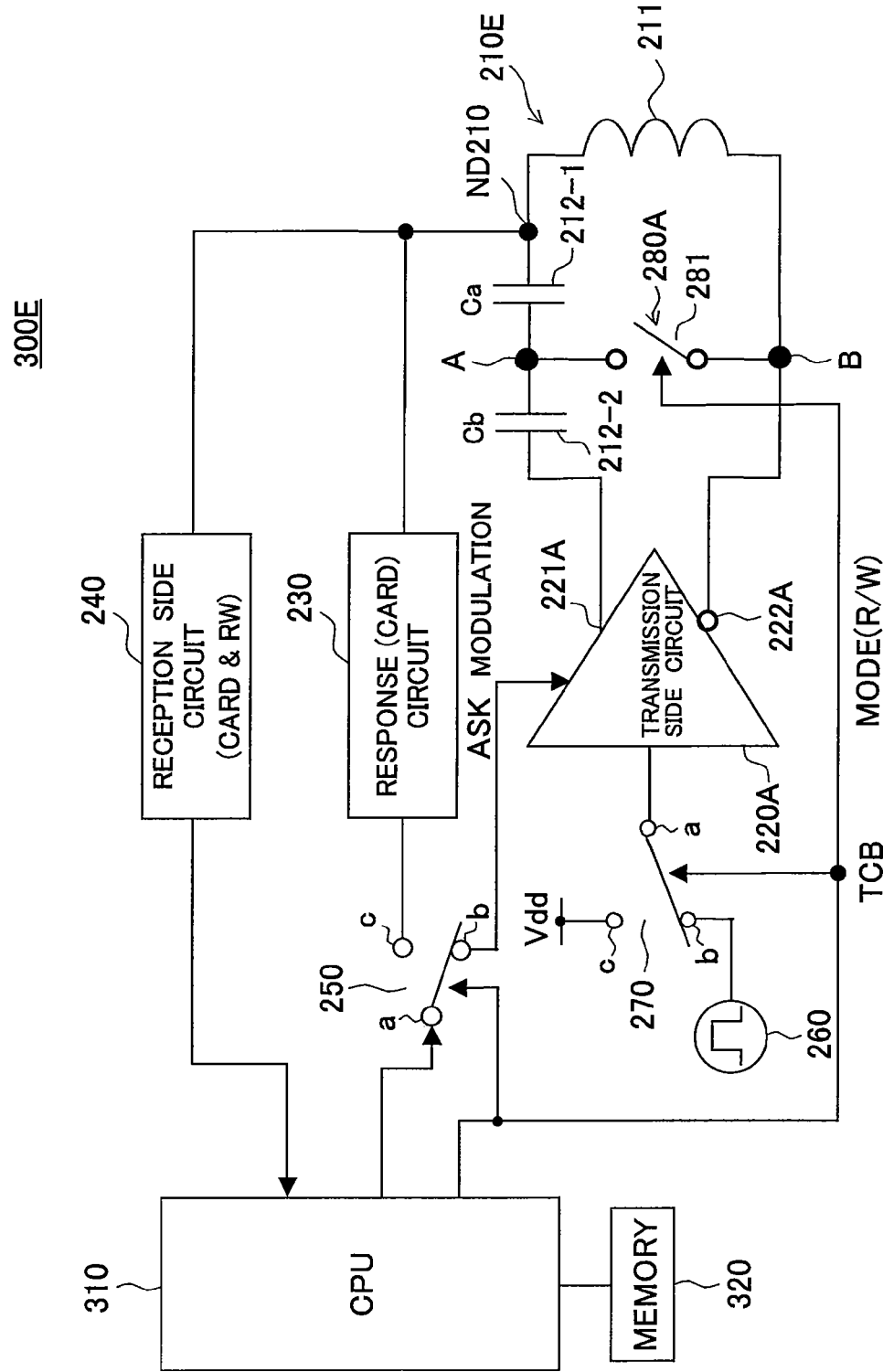
FIG. 20 is a diagram showing an example of the configuration of a non-contact type IC card mounting the communication device of FIG. 13 thereon.
Figure 21:
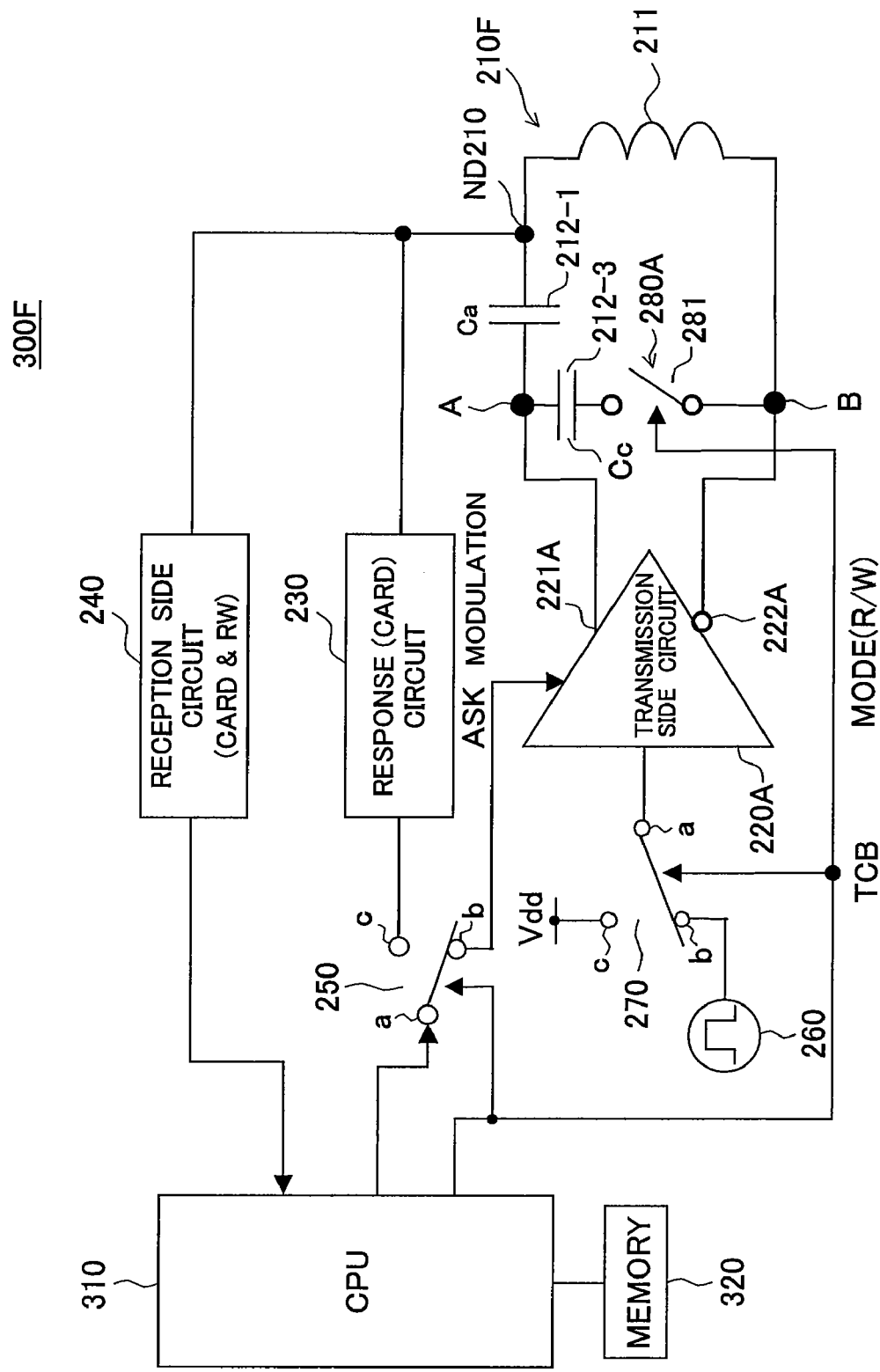
FIG. 21 is a diagram showing an example of the configuration of a non-contact type IC card mounting the communication device of FIG. 14 thereon.

FIG. 14 is a diagram showing a seventh example of the configuration of a communication device having a built-in non-contact type IC card function and reader/writer function mounted in a mobile phone according to an embodiment of the present invention.

The difference of a communication device 200F of FIG. 14 from the communication device 200E of FIG. 13 resides in that another capacitor 212-3 having a capacitance Cc is further connected between the terminal A and the operation contact of the switch 281 in place of connecting one capacitor 212 between the node ND210 and the terminal A.

The communication device 200F in this example is configured so that the tuning frequency in the reader/writer mode becomes lower than the card mode unlike the communication device 200E of FIG. 13.

In the reader/writer mode, the switch 281 is set OFF by the mode control signal MD, therefore the resonance frequency is determined according to the capacitance Ca of the capacitor 212-1 and the inductance L11 of the antenna coil 211.

In the card mode, the switch 281 is set ON by the mode control signal MD. As a result, two capacitors 212-1 and 212-3 are connected in series and the capacitance Ctotal of the total of them is given by the following equation and becomes small.

[Equation 8]

$$C\text{total} = 1/((1/Ca) + (1/Cc)) \tag{8}$$

Accordingly, the resonance frequency fo in the reader/writer mode rises as in the following equation.

[Equation 9]

$$fo = 1/(2\pi\sqrt{(L*C\text{total})}) \tag{9}$$

According to the communication device 200F of FIG. 14, it becomes possible to configure a mobile phone apparatus provided with a communication device having good characteristics at both of the time of the card mode and the time of the reader/writer mode by switching the tuning frequency between the time of the card mode and the time of the reader/writer mode.

As explained above, in a communication device having a built-in card function and reader/writer function, it is not necessary to separately provide antennas for reader/writer use and card use, that is, one antenna is sufficient. As a result, the problems due to interference of the reader/writer W antenna and the card antenna are eliminated.

Further, the antennas are decreased, therefore also the peripheral parts and circuits thereof are decreased, the design becomes easy, and the cost can be reduced. Further, a front end circuit having inexpensive part costs and design costs, a simple configuration, and high performance is obtained.

Further, the switch in the present embodiment can be realized in the usual CMOS process and is small-sized, so can be mounted in a mobile phone.

In the above explanation, the communication device according to the present embodiment was explained taking as an example the case where this was mounted in an information apparatus such as a mobile phone, but it is also possible to configure the non-contact type IC card provided with not only the information apparatus, but also a communication device as shown in FIG. 5, FIG. 6 (FIG. 7), FIG. 8, FIG. 9, FIG. 12, FIG. 13, and FIG. 14 as shown in FIG. 15 to FIG. 21.

The non-contact type IC cards 300 and 300A to 300F shown in FIG. 15 to FIG. 21 are comprised of the configurations of the communication devices shown in FIG. 5, FIG. 6 (FIG. 7), FIG. 8, FIG. 9, FIG. 12, FIG. 13, and FIG. 14 provided with the CPU 310 and memories 320.

In this case, a battery etc. is built-in as the power supply in order to realize the reader/writer function. Alternatively, it is possible to employ a configuration in which the electric power induced in the antenna circuit is smoothened or the like and used as the drive power.

INDUSTRIAL APPLICABILITY

According to the present invention, resonance circuits in accordance with the mode can be formed by one antenna, the peripheral parts and circuits are decreased, the design becomes easy, the cost can be reduced, and the configuration is simple and the performance is high, therefore this can be applied to an information apparatus such as a mobile phone and non-contact type IC card.

The invention claimed is:

1. A communication device comprising:
    a first transmission circuit having first and second output terminals and outputting carriers from the first and second output terminals in a first mode;
    an antenna circuit including a node, an inductor having one end connected to the node and having the other end connected to the second output terminal of the first transmission circuit, and at least one capacitor connected between the node and the first output terminal of the first transmission circuit;
    a second transmission circuit connected to the node of the antenna circuit and outputting the transmission data in a second mode;
    at least one reception circuit connected to the node of the antenna circuit and performing reception processing with respect to data received at the antenna circuit; and
    a circuit switch unit forming the antenna circuit as a serial resonance circuit including the inductor and the capacitor in the first mode and forming the antenna circuit as a parallel resonance circuit including the inductor and the capacitor in the second mode.

2. A communication device as set forth in claim 1, wherein the first transmission circuit includes
    a first transmission buffer which connects the first output terminal to a power source potential or reference potential at the time of the first mode and connects the first output terminal to a reference potential connects at the time of the second mode and
    a second transmission buffer which connects the second output terminal to a reference potential or power source potential at the time of the first mode and connects the second output terminal to a reference potential at the time of the second mode and
    the circuit switch unit is formed jointly using the first transmission buffer and the second transmission buffer.

3. A communication device as set forth in claim 1, wherein the circuit switch unit includes a switch connected between a first output terminal and second output terminal of the first transmission circuit, held in the OFF state at the time of the first mode, and held in the ON state at the time of the second mode.

4. A communication device as set forth in claim 3, wherein the antenna circuit further has a capacitor parallel to the inductor connected to the node and the other end of the inductor.

5. A communication device as set forth in claim 4, wherein the antenna circuit includes
    the capacitor connected to the node and
    another capacitor included in a resonance circuit of either a serial resonance circuit formed at the time of the first mode or a parallel resonance circuit formed at the time of the second mode in accordance with the state of the switch and connected in series with the capacitor and
    a connection node of the two serially connected capacitors is connected through a load element to a power source potential.

6. A communication device as set forth in claim 4, wherein the capacitances of the capacitors are set so that an impedance of the parallel resonance circuit at the time of the second mode is larger than an impedance of the serial resonance circuit at the time of the first mode.

7. A communication device as set forth in claim 3, wherein the antenna circuit includes
    the capacitor connected to the node and
    another capacitor included in a resonance circuit of either a serial resonance circuit formed at the time of the first mode or a parallel resonance circuit formed at the time of the second mode in accordance with the state of the switch and connected in series with the capacitor.

8. A communication device as set forth in claim 1, wherein the circuit switch unit includes:
    a first switch connected between a first output terminal of the first transmission circuit and a reference potential, held in the off state at the time of the first mode, and held in the on state at the time of the second mode and
    a second switch connected between a second output of the first transmission circuit and a reference potential, held in the off state at the time of the first mode, and held in the on state at the time of the second mode.

9. A non-contact type IC card comprising:
    a first transmission circuit having first and second output terminals and outputting carrier data from the first and second output terminals in a reader/writer mode,
    an antenna circuit including a node, an inductor having one end connected to the node and having the other end connected to the second output terminal of the first transmission circuit, and at least one capacitor connected between the node and the first output terminal of the first transmission circuit;
    a second transmission circuit connected to the node of the antenna circuit and modulating in load of the transmission data in the card mode;
    at least one reception circuit connected to the node of the antenna circuit and performing reception processing with respect to the data received at the antenna circuit;

a circuit switch unit forming the antenna circuit as a serial resonance circuit including the inductor and the capacitor in the reader/writer mode in response to a mode control signal and forming the antenna circuit as a parallel resonance circuit including the inductor and the capacitor in the card mode;

a memory; and a control unit for selectively supplying the transmission data to the first transmission circuit or second transmission circuit, performing predetermined processing with respect to the reception data of the reception circuit, and performing access control of the memory.

10. A non-contact IC card as set forth in claim 9, wherein the first transmission circuit includes a first transmission buffer connects the first output terminal to a power source potential or reference potential at the time of the reader/writer mode and connects the first output terminal to a reference potential at the time of the card mode and a second transmission buffer connects the second output terminal to a reference potential or power source potential at the time of the reader/writer mode and connects the second output terminal to a reference potential at the time of the card mode, and the circuit switch unit is formed by joint use of the first transmission buffer and the second transmission buffer.

11. A non-contact IC card as set forth in claim 9, wherein the circuit switch unit includes a switch connected between a first output terminal and second output terminal of the first transmission circuit, held in the off state at the time of a reader/writer mode, and held in the on state at the time of the card mode.

12. A non-contact type IC card as set forth in claim 11, wherein the antenna circuit further has a capacitor parallel to the inductor connected to the node and the other end of the inductor.

13. A non-contact type IC card as set forth in claim 12, wherein the antenna circuit includes the capacitor connected to the node and another capacitor included in a resonance circuit of either a serial resonance circuit formed at the time of the reader/writer mode or a parallel resonance circuit formed at the time of the card mode in accordance with the state of the switch and connected in series with the capacitor and a connection node of the two serially connected capacitors is connected through a load element to a power source potential.

14. A non-contact type IC card as set forth in claim 12, wherein the capacitances of the capacitors are set so that an impedance of the parallel resonance circuit at the time of the card mode is larger than an impedance of the serial resonance circuit at the time of the reader/writer mode.

15. A non-contact type IC card as set forth in claim 11, wherein the antenna circuit includes the capacitor connected to the node and another capacitor included in a resonance circuit of either a serial resonance circuit formed at the time of the reader/writer mode or a parallel resonance circuit formed at the time of the card mode in accordance with the state of the switch and connected in series with the capacitor.

16. A non-contact IC card as set forth in claim 9, wherein the circuit switch unit includes:

a first switch connected between a first output terminal of the first transmission circuit and a reference potential, held in the off state at the time of the reader/writer mode, and held in the on state at the time of the card mode and a second switch connected between a second output of the first transmission circuit and a reference potential, held in the off state at the time of the reader/writer mode, and held in the on state at the time of the card mode.

17. An information apparatus having a communication function with a communication network, comprising:

a communication device having a reader/writer function and a card function, the communication device having a first transmission circuit having first and second output terminals and outputting carriers from the first and second output terminals in the first mode, an antenna circuit including a node, an inductor having one end connected to the node and having the other end connected to the second output terminal of the first transmission circuit, and at least one capacitor connected between the node and the first output terminal of the first transmission circuit, a second transmission circuit connected to the node of the antenna circuit and outputting the transmission data in the second mode, at least one reception circuit connected to the node of the antenna circuit and performing reception processing with respect to the data received at the antenna circuit, and a circuit switch unit forming the antenna circuit as a serial resonance circuit including the inductor and the capacitor in the first mode and forming the antenna circuit as a parallel resonance circuit including the inductor and the capacitor in the second mode.

18. An information apparatus as set forth in claim 17, wherein the first transmission circuit includes a first transmission buffer which connects the first output terminal to a power source potential or reference potential at the time of the first mode and connects the first output terminal to a reference potential at the time of the second mode and a second transmission buffer which connects the second output terminal to a reference potential or power source potential at the time of the first mode and connects the second output terminal to a reference potential at the time of the second mode and the circuit switch unit is formed jointly using the first transmission buffer and the second transmission buffer.

19. An information apparatus as set forth in claim 17, wherein the circuit switch unit includes a switch connected between a first output terminal and second output terminal of the first transmission circuit, held in the off state at the time of the first mode, and held in the on state at the time of the second mode.

20. An information apparatus as set forth in claim 19, wherein the antenna circuit further has a capacitor parallel to the inductor connected to the node and the other end of the inductor.

21. An information apparatus as set forth in claim 20, wherein the antenna circuit includes the capacitor connected to the node and another capacitor included in a resonance circuit of either a serial resonance circuit formed at the time of the first mode or a parallel resonance circuit formed at the time of the second mode in accordance with the state of the switch and connected in series with the capacitor.

22. An information apparatus as set forth in claim 20, wherein the antenna circuit includes the capacitor connected to the node and another capacitor included in a resonance circuit of either a serial resonance circuit formed at the time of the first mode or a parallel resonance circuit formed at the time of the second mode in accordance with the state of the switch and connected in series with the capacitor and a connection node of the two serially connected capacitors is connected through a load element to a power source potential.

23. An information apparatus as set forth in claim 20, wherein the capacitances of the capacitors are set so that an impedance of the parallel resonance circuit at the time of the card mode is larger than an impedance of the serial resonance circuit at the time of the first mode.

24. An information apparatus as set forth in claim 17, wherein the circuit switch unit includes:

a first switch connected between a first output terminal of the first transmission circuit and a reference potential, held in the off state at the time of the first mode, and held in the on state at the time of the second mode and a second switch connected between a second output of the first transmission circuit and a reference potential, held in the off state at the time of the first mode, and held in the on state at the time of the second mode.

\* \* \* \* \*